US011563590B1

(12) United States Patent
Bowen et al.

(10) Patent No.: US 11,563,590 B1
(45) Date of Patent: Jan. 24, 2023

(54) CERTIFICATE GENERATION METHOD

(71) Applicant: Amazon Technologies, Inc., Seattle, WA (US)

(72) Inventors: Peter Zachary Bowen, Bainbridge Island, WA (US); Todd Lawrence Cignetti, Ashburn, VA (US); Preston Anthony Elder, III, Fairfax, VA (US); Brandonn Gorman, Seattle, WA (US); Ronald Andrew Hoskinson, Herndon, VA (US); Jonathan Kozolchyk, Seattle, WA (US); Kenneth Lawler, Seattle, WA (US); Marcel Andrew Levy, Seattle, WA (US); Kyle Benjamin Schultheiss, Centreville, VA (US); Sandeep Shantharaj, Herndon, VA (US); Param Sharma, Haymarket, VA (US); Jose Maria Silveira Neto, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 452 days.

(21) Appl. No.: 16/018,009

(22) Filed: Jun. 25, 2018

Related U.S. Application Data

(60) Provisional application No. 62/652,235, filed on Apr. 3, 2018.

(51) Int. Cl.
H04L 9/32 (2006.01)
(52) U.S. Cl.
CPC .......... H04L 9/3268 (2013.01); H04L 9/3247 (2013.01)

(58) Field of Classification Search
CPC ................ H04L 9/3247; H04L 9/3263; H04L 9/3268; H04L 63/0823
See application file for complete search history.

(56) References Cited

U.S. PATENT DOCUMENTS 6,035,402 A 3/2000 Vaeth et al.
6,671,804 B1 * 12/2003 Kent ................... H04L 63/0823
713/161
7,395,428 B2 7/2008 Williams et al.
(Continued)

OTHER PUBLICATIONS

Dang, Q., "Recommendations for Applications Using Approved Hash Algorithms," National Institute of Standards and Technology (NIST) Special Publication 800-107, Revision 1, Aug. 2012, 25 pages.

(Continued)

Primary Examiner — Linglan Edwards
(74) Attorney, Agent, or Firm — Davis Wright Tremaine LLP

(57) ABSTRACT

A computing resource service provider provides a certificate management service that allows customers of the computing resource service provider to create, distribute, manage, and revoke digital certificates issued by public and/or private certificate authorities. In an embodiment, when a new certificate is generated, a certificate template is used to apply various settings and policies for the new certificate. In various examples, templates may be used to establish default values, enforce required and optional values, place restrictions on one or more data fields, and enforce signature requirements. In some embodiments, the template establishes rules for rejecting certificate requests that don't conform to the template.

20 Claims, 13 Drawing Sheets

(56) References Cited

U.S. PATENT DOCUMENTS

| | | | |
|---|---|---|---|
| 7,484,089 B1 | 1/2009 | Kogen et al. | |
| 7,526,642 B2* | 4/2009 | Hurtta | H04L 63/0823 |
| | | | 713/155 |
| 7,644,270 B1 | 1/2010 | Cherukumudi et al. | |
| 7,937,583 B2 | 5/2011 | Thornton et al. | |
| 8,250,361 B2 | 8/2012 | Kido et al. | |
| 8,370,626 B2* | 2/2013 | Liu | H04L 9/3265 |
| | | | 713/157 |
| 8,494,485 B1 | 7/2013 | Broch | |
| 8,806,195 B2* | 8/2014 | Wnuk | H04L 63/062 |
| | | | 713/157 |
| 9,032,473 B2 | 5/2015 | Guccione et al. | |
| 9,215,231 B1 | 12/2015 | Bowen | |
| 9,306,935 B2 | 4/2016 | Bowen | |
| 9,332,002 B1 | 5/2016 | Bowen | |
| 9,552,485 B1 | 1/2017 | Cignetti et al. | |
| 9,730,065 B1 | 8/2017 | Chen | |
| 9,979,553 B2 | 5/2018 | Kommireddy et al. | |
| 10,425,399 B2* | 9/2019 | Kravitz | H04L 9/3263 |
| 2004/0039925 A1 | 2/2004 | McMillan et al. | |
| 2005/0021969 A1 | 1/2005 | Williams et al. | |
| 2005/0033957 A1 | 2/2005 | Enokida | |
| 2005/0069136 A1 | 3/2005 | Thornton et al. | |
| 2005/0076203 A1 | 4/2005 | Thornton et al. | |
| 2006/0200857 A1 | 9/2006 | Yokota | |
| 2007/0055882 A1 | 3/2007 | Gaucas et al. | |
| 2008/0091952 A1 | 4/2008 | Sumner et al. | |
| 2008/0183853 A1 | 7/2008 | Manion et al. | |
| 2009/0319783 A1 | 12/2009 | Thornton et al. | |
| 2010/0031025 A1 | 2/2010 | Zhang et al. | |
| 2010/0228970 A1 | 9/2010 | Oka et al. | |
| 2010/0268942 A1 | 10/2010 | Hernandez-Ardieta et al. | |
| 2010/0275012 A1 | 10/2010 | Kido et al. | |
| 2011/0113240 A1* | 5/2011 | Fu | H04L 63/0823 |
| | | | 713/156 |
| 2011/0197061 A1 | 8/2011 | Chou et al. | |
| 2011/0213961 A1* | 9/2011 | Wnuk | H04L 63/062 |
| | | | 713/156 |
| 2011/0219227 A1 | 9/2011 | Sharif et al. | |
| 2012/0023327 A1 | 1/2012 | Nagasaki | |
| 2012/0023560 A1 | 1/2012 | Yanagi | |
| 2012/0179907 A1 | 7/2012 | Byrd et al. | |
| 2013/0254535 A1 | 9/2013 | Akehurst et al. | |
| 2015/0222604 A1 | 8/2015 | Ylonen | |
| 2015/0244707 A1 | 8/2015 | Bowen | |
| 2015/0254451 A1 | 9/2015 | Doane et al. | |
| 2016/0057132 A1 | 2/2016 | Gibson et al. | |
| 2016/0142216 A1 | 5/2016 | Turner et al. | |
| 2016/0173286 A1 | 6/2016 | Gallagher | |
| 2016/0173287 A1 | 6/2016 | Bowen | |
| 2016/0182494 A1 | 6/2016 | Lissounov et al. | |
| 2017/0006022 A1 | 1/2017 | Gunti et al. | |
| 2017/0012967 A1* | 1/2017 | Holloway | H04L 9/3247 |
| 2017/0041151 A1 | 2/2017 | Kommireddy et al. | |
| 2017/0195122 A1 | 7/2017 | Obaidi et al. | |
| 2017/0228412 A1 | 8/2017 | Agarwal et al. | |
| 2017/0279785 A1 | 9/2017 | Kent | |
| 2018/0019993 A1* | 1/2018 | Kravitz | H04L 9/0836 |
| 2018/0219678 A1 | 8/2018 | Medvinsky et al. | |
| 2018/0287804 A1 | 10/2018 | Geisbush | |
| 2019/0207772 A1 | 7/2019 | Hecht et al. | |
| 2019/0245700 A1 | 8/2019 | Dobre et al. | |

OTHER PUBLICATIONS

"Digital Certificates for Every Security Need," ©2018 DigiCert, Inc., <https://www.digicert.com/digital-certificates> [retrieved Oct. 23, 2018], 4 pages.

"Digital Certificate Template Best Practices White Paper," © 2018 Certified Security Solutions, <https://info.css-security.com/white-papers-certificate-templates> [retrieved Oct. 23, 2018], 7 pages.

"Symantec Private Certification Authority Service (Private CA)," © 2018 DigiCert, Inc., <https://www.websecurity.symantec.com/security-topics/private-ssl> [retrieved Oct. 23, 2018], 9 pages.

Cooper et al., "Internet X.509 Public Key Infrastructure Certificate and Ceililicate Revocation List (CRL) Profile," Request for Comments: 5280, May 2008, 141 pages.

Nystrom et al., "PKCS #10: Certification Request Syntax Specification Version 1.7," Request for Comments 2986, Nov. 2000, 14 pages.

Nystrom et al., "PKCS #9: Selected Object Classes and Attribute Types Version 2.0," Request for Comments 2985, Nov. 2000, 42 pages.

* cited by examiner https://console.serviceprovider.com/CM

Create Template

Step1: Choose Name

Step2: Choose starting template

Step 3: Set Validity Period

Step 4: Configure Subject

Step 5: Configure extensions

Step 6: Set general template rules

Step 7: Review

Choose name, usage, and description

Give your template a name, select how certificates issued with this template will be used, and write a description. When users request certificates they will use the name and description to help them choose the correct template.

Name *  [                    ]
For example, myCompany internal server certificate Usage *  [ Server ▼ ]
Select how the certificates will be used. Server, Client, Root CA, Subordinate CA, or other Description *  [                    ]
Users who have been granted access to use this template will see the description when selecting a template

* Required

[ Next ]  [ Previous ]  [ Cancel ]

CERTIFICATE GENERATION METHOD

CROSS-REFERENCE TO RELATED APPLICATIONS

This application claims the benefit of U.S. Provisional Patent Application No. 62/652,235, filed Apr. 3, 2018, entitled "CERTIFICATE TEMPLATE SYSTEM," the disclosure of which is herein incorporated in its entirety. This application incorporates by reference for all purposes the full disclosure of co-pending U.S. patent application Ser. No. 16/018,004, filed Jun. 25, 2018, entitled "CERTIFICATE AUTHORITY," which claims the benefit of U.S. Provisional Patent Application No. 62/652,240, filed Apr. 3, 2018, entitled "PRIVATE CERTIFICATE AUTHORITY," and co-pending U.S. patent application Ser. No. 16/018,014, filed Jun. 25, 2018, entitled "CERTIFICATE MANAGER," which claims the benefit of U.S. Provisional Patent Application No. 62/652,236, filed Apr. 3, 2018, entitled "CERTIFICATE MANAGEMENT SYSTEM."

BACKGROUND

Computer-based transactions are an important part of running a modern business. By performing operations in a computing environment, transaction data can be exchanged electronically between parties over computer networks, thereby allowing the transactions to occur quickly over great distances. However, when exchanging data over a publicly accessible computer network, it takes considerable resources to prevent third parties from interfering with the transaction by impersonating one of the parties or by altering the transaction data. In order to mitigate this risk, a digital certificate may be used to prove the identity of the certificate owner. Such digital certificates are widely used to authenticate the exchange of information between computer systems and therefore, providing improved systems for managing and using digital certificates is an important problem.

BRIEF DESCRIPTION OF THE DRAWINGS

Various techniques will be described with reference to the drawings, in which:

FIG. 7 illustrates an example of a user interface for setting a name of a new certificate template, in an embodiment;

DETAILED DESCRIPTION

Figure 1:
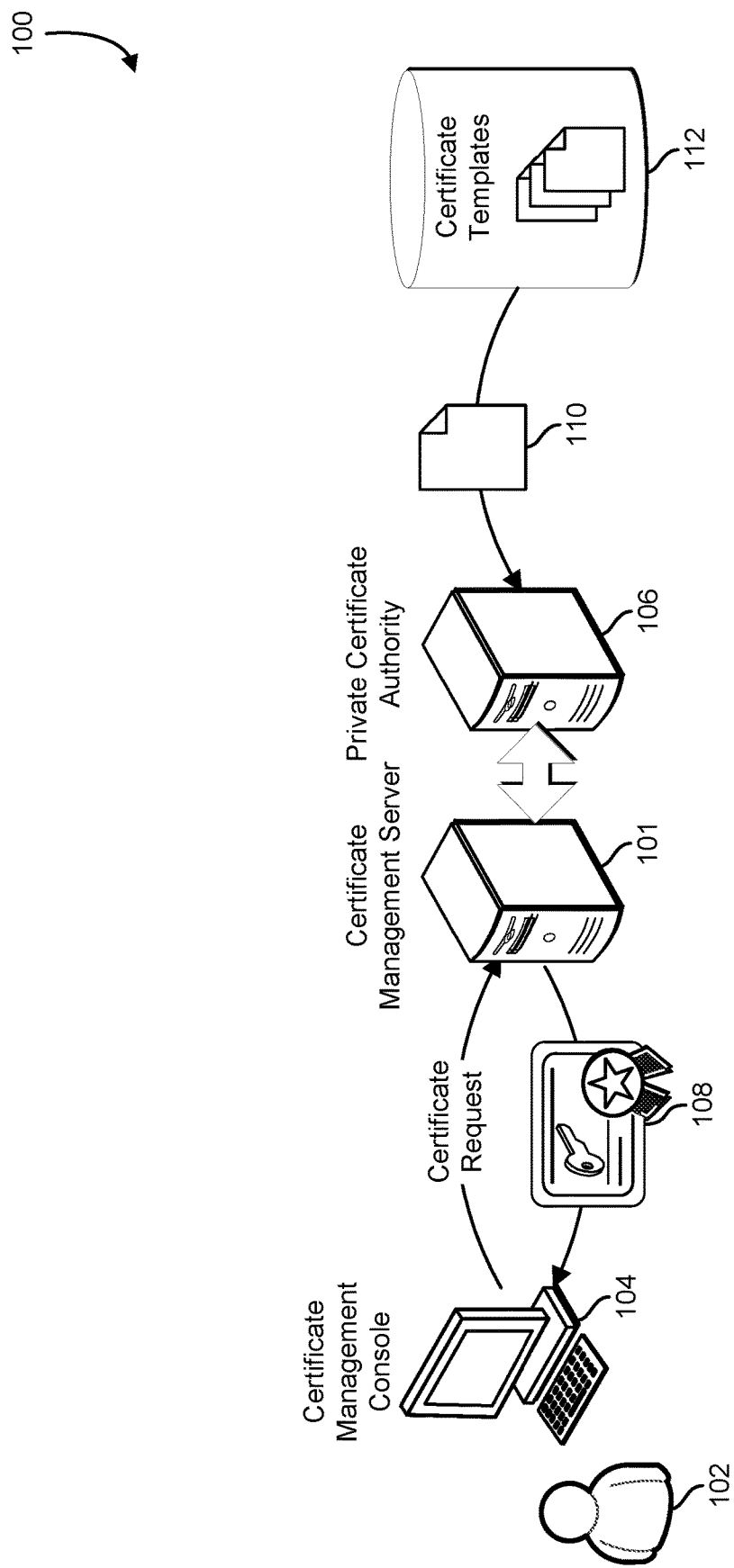
FIG. 1 illustrates an example of a private certificate authority ("CA") that generates private digital certificates using templates, in an embodiment.

The present document describes a system and method that generates and issues digital certificates based on certificate templates. In an embodiment, a certificate template is data structure that describes various default values, certificate policies, rules, and certificate properties that are enforced by a certificate authority when a new certificate is created. In an embodiment, an administrator of a private certificate authority is able to create templates that control the information included in the certificates issued by the private certificate authority. In an embodiment, a certificate template may be used to control the contents of a digital certificate, and to create rules for rejecting digital certificates that do not conform to the template. In an embodiment, users that submit requests to the private certificate authority specify a template with the request. In an embodiment, the private certificate authority processes the rules and settings described in the template, and may perform various actions. In an embodiment, the private certificate authority may modify the request to conform to the template before fulfilling the request. In an embodiment, the private certificate authority may determine that the request conforms to the template and fulfill the request. In an embodiment, the private certificate authority may reject the request as a result of determining that the request does not conform to the template.

In an embodiment, a variety of rules and settings can be enforced with certificate templates. In an embodiment, users can designate certificate fields as required. In an embodiment, if the administrator of a private certificate authority wants every certificate issued from a PCAS CA to include the Subject Alternative Name ("SAN") field, the administrator can mark the SAN field as a required field in the certificate template for the private certificate authority. In this embodiment, if the field is not included in a CSR submitted by a requester, the private certificate authority rejects the request. In an embodiment, an administrator can specify a default value in the template for a field to insert the value into the request or override a provided value. In this embodiment, an administrator can require all certificates issued by their CA to include a Common Name ("CN"), Organization Unit ("OU"), and Organization ("O"), State ("ST"), and Country ("US"), and the administrator can specify default values which are inserted or which overwrite the values in the request, such as CN=Example.com, OU=Example Org, O=Example, Inc, ST=Washington, C=US. In an embodiment, an administrator can specify a list or range of allowed values for fields in their certificates. In an embodiment, for example, using a template, an administrator can choose to allow only domain name service ("DNS") subject alternative names that end in example.com such as example.io, and example.xyz. In an embodiment, an administrator can create and use application-specific templates to issue certificates for their applications that need custom fields or values. For example, some applications require certificates to have specific extended key usage ("EKU") values, and in an embodiment, an administrator can require specific templates from those applications.

In an embodiment, templates may apply to the Subject, Signature Algorithm, Validity Period, and Extensions fields. In an embodiment, templates may have a number of rules that can be specified for individual fields in the certificate, plus general rules that apply to multiple fields or to the CSR overall. In an embodiment, a certificate template may specify that a particular field is required or prohibited. In an embodiment, a certificate template may specify a default value for a particular field. In an embodiment, a certificate template may specify an override value, or a set of allowed values for a particular field. In an embodiment, the certificate template may specify one or more prohibited values for a particular field.

In an embodiment, a certificate template may specify particular rules that may apply to one or more fields or to a certificate request in general. In an embodiment, the certificate template may specify a maximum validity period for a digital certificate, an ordering for certificate extensions, a requirement or prohibition against certain certificate extensions, and various digital signature requirements.

In an embodiment, the system is able to support a user profile object, which represents information about an individual user, and which may be used to populate subject information in the certificate request, or to send notifications, or for other purposes. This simplifies the experience for the CA administrator when creating or customizing templates.

In an embodiment, the certificate manager console simplifies the user experience for customers requesting a certificate with a template. In an embodiment, defining templates this way makes it easier for users to request a certificate that includes the correct fields and values. In an embodiment, when using the certificate manager, users need only specify the CN and SAN fields, and don't need to know about other information in the request.

In an embodiment, templates simplify the certificate manager user experience. In an embodiment, the certificate manager uses templates to simplify the Certificate Request workflow. In an embodiment, if only one template is authorized for an account, the certificate manager can skip the step in which the user chooses a template. In an embodiment, once the user or system chooses a template, the certificate manager displays a form for users to enter information for their certificate request. In an embodiment, the default view of the form is very simple. In an embodiment, the certificate manager displays only the required fields that do not have a default value. In an embodiment, this is the minimum amount of information that users are required to enter. In an embodiment, users can expand the form to display required fields that have default values that can be overridden. In an embodiment, the third view is a fully expanded form that shows all of the fields in the certificate request. In an embodiment, with this view the user can see everything that will be included in the request and he or she can enter custom fields or fields not specified in the template. In an embodiment, users can also view but not change required fields that have default values which cannot be overridden. In an embodiment, the certificate manager includes the allowed values from the template in a drop-down list for the user to select from. In an embodiment, the certificate manager uses prohibited values to validate customer input and reject out-of-range values. In an embodiment, if the template specifies non-required fields are to be rejected, the certificate manager does not allow users to add any additional fields.

In an embodiment, the private certificate authority may use templates to provide improved security by carefully managing how the private key for the CA is generated and protected, and how access to the private key is controlled. In an embodiment, the system takes additional steps to secure the workflows and prevent unauthorized issuance by using signing keys at each step of the worker.

As one skilled in the art will appreciate in light of this disclosure, certain embodiments may be capable of achieving certain advantages, including some or all of the following: (1) improved security for private certificate authorities, (2) a simplified user interface for submitting certificate requests, and (3) better control over the digital certificates issued by a certificate authority.

FIG. 1 illustrates an example of a system 100 that includes a private certificate authority 106 that generates private digital certificates using templates, in an embodiment. In an embodiment, a certificate authority is an entity that provides digital certificates which may be used to cryptographically verify the identity of the entity to which the digital certificate is issued. In an embodiment, the certificate authority controls a public-private key pair. In an embodiment, when the certificate authority receives a request for digital certificate from a requester, the certificate authority confirms the information provided by the requester and generates a digital certificate in accordance with the rights of the requester to generate digital certificates. In an embodiment, the certificate authority signs the digital certificate with the private key of the certificate authority. By confirming the digital signature on the digital certificate with the public key of the certificate authority, and by confirming a digital signature of a purported entity with a public key in the digital certificate, the identity of the purported entity can be confirmed to be that which is represented in the digital certificate (to the extent that the certificate authority is trusted).

In an embodiment, a computing resource service provider ("CRSP") provides a certificate manager ("CM") server 101 that allows customers to create, distribute, manage, and revoke digital certificates issued by a public and/or private certificate authority ("PCA"). In an embodiment, the CRSP provides the certificate management server 101 to the customer 102 via a web interface and the customer accesses the certificate management server 101 via a web browser on a certificate management console 104. In an embodiment, the certificate management server 101 allows the customer to generate a private certificate authority 106 that is hosted by the CRSP, and controlled by the customer 102. In an embodiment, the customer uses the private certificate authority 106 to acquire a digital certificate 108 for an entity within the customer's internal network which is signed with a private key of the private certificate authority 106. In an embodiment, the private certificate authority 106 is accessible via an application programming interface ("API"). In an embodiment, the API is a network-accessible web API. In an embodiment, the certificate management server 101 provides the customer with an interface for the management of private certificates by interfacing with the private certificate authority 106 via the API. By providing a certificate manager and the ability to create private certificate authorities and associated digital certificates, a computing resource service provider is able to provide a service that has significant advantages over both conventional certificate authorities ("CAs"), and private certificate authorities deployed and managed within a customer datacenter.

In an embodiment, the certificate management server 101 may be usable via one or more interfaces. In an embodiment, the certificate management server 101 provides an application programming interface ("API"). The API allows customer applications to create and manage private certificate authorities, and to perform certificate management operations programmatically. In an embodiment, certificate management operations may include creating a digital certificate, revoking a digital certificate, renewing a digital certificate, exporting a digital certificate, or importing a digital certificate. In an embodiment, the certificate management server 101 provides a graphical user interface in the form of a website with a collection of interactive webpages for performing various operations on private certificate authorities and digital certificates. In an embodiment, the certificate management server 101 provides a command line interface ("CLI") that allows for digital-certificate and certificate-authority operations to be performed via a text-based interactive console or a programmatic script.

In an embodiment, a certificate authority ("CA"), such as the private certificate authority 106, issues a certificate by validating that a public key belongs to a named resource such as a server, creating a certificate containing both the name and the public key, and digitally signing the certificate to assert that the public key belongs to the resource. In an embodiment, a CA issues a certificate to identify a host by signing a certificate request provided by an authorized requester. In an embodiment, once issued, the host may present the certificate to other hosts as proof of its identity. In an embodiment, a host is said to trust a CA if the CA's certificate is represented in a database of trusted CAs maintained by the host, often referred to as a trust store. In an embodiment, a trust store is a list of trusted CA certificates stored by the host's operating system or by one or more applications on the host computer system. In an embodiment, a trust store may be maintained by a web browser or a web server that is running on the host. In an embodiment, applications on the host may access a trust store maintained and stored by the operating system of the host. In an embodiment, because certificates may be used as a basis of trust and identity for many applications, it is important that CAs be operated securely and only issue certificates when authorized to do so. In an embodiment, revocation is provided as an additional CA function. In an embodiment, revoking a certificate distrusts the certificate and communicates to clients and other relying parties that the certificate is no longer trusted. For example, a certificate identifying a host can be revoked if the host is compromised. In an embodiment, when a certificate of a host is revoked, applications that rely on the certificate stop trusting the host as a result. Collectively, this system of establishing trust based on CAs, certificates, and public key cryptography is known as public key infrastructure ("PKI").

In an embodiment, the private certificate authority 106 is provided as a hosted private certificate authority. In an embodiment, a hosted private certificate authority ("HPCA") is provided as a hosted certificate authority service which allows enterprises and Internet of things ("IoT") customers to create a private certificate authority using, in some embodiments, a computing resource service provider to do the work of creating, managing and securing certificate authority certificates, private certificates, and real-time services that vend certificate states. By using a private certificate authority hosted by a service provider, in various embodiments, customers are provided with security, configuration, management, and monitoring of a high availability private certificate authority, without hiring a security and maintenance team. In an embodiment, an HPCA is provided as a feature of a Certificate Manager which is also provided by the computing resource service provider. In an embodiment, the HPCA allows customers to manage their certificates from a console, and perform operations such as creating, rotating, and revoking both public and private certificates. In an embodiment, the certificate management server 101 manages certificate renewal for certificates controlled by the customer including private certificates issued by the HPCA. By providing managed certificate renewal, the certificate management server 101 is able to reduce outages caused by certificate expiration. In an embodiment, customers may use the HPCA to deploy private certificates on various computing resources provided by the CRSP, including load balancers, content delivery networks ("CDNs"), and application programming interface Gateway endpoints. In an embodiment, customers can export private certificates from the HPCA and deploy them on other services and endpoints not associated with the CRSP.

In an embodiment, the private certificate authority 106 uses a template 110 selected from a set of templates 112 to generate the digital certificate 108. In an embodiment, the template 110 is identified in the request for a digital certificate provided by the customer 102. In an embodiment, the set of templates 112 may include templates for a plurality of certificate authorities, and the customer 102 may have access to a subset of templates for creating digital certificates. In an embodiment, the selected template 110 imposes policy constraints on the digital certificates created with the private certificate authority 106.

In an embodiment, certificate templates are resources of the computing resource service provider for defining policy rules and settings for certificates issued by a private CA. In an embodiment, certificate authority administrators and users who want digital certificates issued by the CA use a certificate template to simplify the request process. In an embodiment, the CA enforces a requirement that a requester use a template, or a template chosen from a set of approved templates.

In an embodiment, a certificate authority administrator creates templates to control the information included in the certificates issued by the CA. In an embodiment, the administrator uses templates to set policy rules for certificate authorities under their control, and default settings for the certificates issued by their certificate authorities. In an embodiment, the administrator controls the information that does or does not go into certificates and the administrator can create rules for rejecting certificate requests that don't follow the rules. In an embodiment, administrators that want a certificate issued from a private certificate authority 106 specify a template with a certificate request.

In an embodiment, when a user requests a certificate, they specify a template which determines the rules and settings for that certificate. In an embodiment, the private certificate authority 106 processes rules and settings from the template when processing incoming certificate requests. In an embodiment, the private certificate authority 106 may modify the request and may pass it on to be issued, pass it on unmodified, or reject the request, depending on the contents of the request and of the template.

In an embodiment, various rules and settings can be enforced with certificate templates. In an embodiment, users can designate certificate fields as required. In an embodiment, if a user wants every certificate issued from a particular private certificate authority to include the Subject Alternative Name ("SAN") field, the administrator of the private certificate authority can mark the SAN field as a required field and a certificate template, and requires that the certificate template be used for all certificate signing requests. In an embodiment, if the field is not included in a certificate signing request, the private certificate authority 106 rejects the request. In an embodiment, the administrator of the private certificate authority 106 specifies a default value in the template for a field, which causes the private certificate authority 106 to insert the value into the request or override the provided value. In an embodiment, an administrator can require all certificates issued by their CA to include a Common Name ("CN"), Organization Unit ("OU"), and Organization ("O"), State ("ST"), and Country ("US"), and the administrator can specify default values which are inserted or which overwrite the values in the request, such as CN=Example.com, OU=Example Org, O=Example, Inc, ST=Washington, C=US. In an embodiment, an administrator specifies a list or range of allowed values for fields in their certificates. In an embodiment, an administrator can allow only DNS subject alternative names that end in example.com, example.io, and example.xyz. In an embodiment, an administrator creates and uses application-specific templates to issue certificates for their applications that need custom fields or values. In an embodiment, particular applications may require certificates to have specific extended key usage (EKU) values, and to address this problem, an administrator may generate an appropriate template and assign the template to the particular application to enforce this condition.

In an embodiment, templates apply to the Subject, Signature Algorithm, Validity Period (Not Before and Not After date fields), and Extension fields. In an embodiment, these fields are defined in RFC 5280 Internet X.509 Public Key Infrastructure Certificate and Certificate Revocation List ("CRL") Profile.

In an embodiment, templates have four kinds of rules that can be specified for individual fields in the certificate, plus general rules that apply to multiple fields or to the certificate signing request overall. In an embodiment, the following rules apply to one field in the incoming certificate signing request.

- Required (field)—the field must be included in certificates issued using this template. In an embodiment, if the field is not present, the system will insert the default value if it is specified in the template. In an embodiment, if the field is not present, the system rejects the request.
- Prohibited (field, actionIfPresent)—the field may not be included in certificates issued using this template. actionIfPresent can be either Remove or Reject, indicating what to do it the field is present. If not specified, the default is to Remove the field from the CSR.
- Default value (field, defaultValue, inheritFromCA)—the field and defaultValue are inserted if the CSR does not include the field. If the CSR includes the field and a value, then defaultValue overrides the value in the CSR. defaultValue can be of a complex type. For example, extension fields can specify a value and a parameter indicating whether the extension is critical or not. Systems that process certificates can ignore non-critical extensions if they don't recognize them, but they cannot ignore critical extensions.
- Allow override (field, allowOverride)—if allowOverride is specified, then a value in the CSR can override the Fixed value.
- Allowed values (field, valueList, valueRange)—the CSR is rejected if the value for the field is not in the list of allowed values or within the range of values.
- Prohibited values (field, valueList, valueRange)—the CSR is rejected if the value for a field is in the list of prohibited values or within the range of prohibited values.
- General rules are pre-defined logic or rules that apply to multiple fields or to the CSR overall. For example:
  - Reject the CSR if the validity period is greater than TBD days/months/years
  - Set the notBefore date to the current time and date
  - Do not reorder the extension fields from the CSR
  - Remove any fields from the CSR that are not Required
  - Reject CSRs containing fields not designated as Required
  - Order of fields matches the order in the template, unless "do not reorder" is specified
  - Rule: Do not issue certificates beyond the validity of the CA's certificate
  - Rule: All keys in the hierarchy use the same algorithm family
  - Rule: The key length of the CA is the same as or longer than the key lengths of keys of certificates issued by the CA
  - Ignore CSR signature (allows changes to CSR)
  - Include the parent domain when requesting a new certificate for a www.host (e.g.: www.endpoint.com also includes endpoint.com as a SAN)

In an embodiment, there are a number of additional rules and settings supported. In an embodiment, the CSR does not include a validity period, serial number, or support for special values, such as a value that indicates the signature algorithm should be inherited from the issuing CA. In an embodiment, templates are able to constrain or specify these settings and rules, even though the certificate signing request doesn't support them. In an embodiment, the system is able to support the following examples:

- Signature algorithm: Inherit the value from the issuing CA or specify an algorithm explicitly.
- Validity: years/months/days/hours from the time the certificate is issued or end date of the certificate. If Validity is specified as a time period, Not After will be set by the CA based on the time of issuance. Alternatively, a specific Not After date can be specified as a field. Additional rules apply. For example, the validity period of the certificate cannot exceed the validity period of the CA, Not Before must be before Not After, Not After must be after Not Before.
- Not Before: should be some period of time before the time of issuance. In an embodiment, the user is able to specify the period.
- Two factor authentication: Require certificate requests to be made with two-factor authorization enabled, and reject requests made without it.

In an embodiment, templates are able to control and specify the order of extension fields. In an embodiment, templates are able to control and specify the order of distinguished names ("DN") components (CN, O, OU, etc.). In an embodiment, this feature is helpful when supporting tools that perform a string comparison of the entire DN at once, versus performing individual comparisons per field, depend on the order.

In an embodiment, the system is able to support a user profile object, which represents information about an individual user, and may be used to populate subject information in the certificate request, or to send notifications, or for other purposes. In an embodiment, user-specific fields in a template may be represented in several ways. In an embodiment, the template represents user information using variables, such as user@, email@, etc. to fill in user-specific information. In addition, information about the organization may be populated from a common data store, and may be maintained by organizations, so for example, the template can represent information about the user's organization using variables such as organization@, organizationUnit@, city@, state@. In an embodiment, this simplifies the experience for the CA administrator when creating or customizing templates.

In an embodiment, the private certificate authority 106 allows an authorized user to create, update, import, export, list, describe, and delete templates. In an embodiment, template actions (create, update, import, export, list, describe, and delete) are controlled by security policies associated with the customer account. In an embodiment, separately, the owner of a CA in one account can specify a list of templates that are authorized for use by another account using account linking (Create/AcceptCAAccountAuthorization). In an embodiment, accounts that are authorized through this process can use templates indicated in the authorization request to issue certificates, but such accounts cannot perform other template operations. In an embodiment, an administrator grants security permissions for a certificate operation (including operations on templates) by creating a security role in the customer account, and allowing a user in another account to assume the role.

In an embodiment, an authorized user can export an existing template to a file in another format, such as a JSON format, edit template fields in a text editor, and import the template by creating a new template based on the file (CreateTemplate). In an embodiment, existing templates can also be updated or modified using a certificate authority management console or API.

In an embodiment, a template can be empty, containing no rules or default strings. In an embodiment, such a template can be used to allow a CA to sign any certificate signing request. In an embodiment, an administrator can create a template with no rules or settings.

In an embodiment, templates enforce policies and rules on certificate requests (for example, certificate signing requests or CSR's). In an embodiment, processing a CSR with a template can change the original CSR to conform to the rules in the template. In an embodiment, the result of processing a CSR is either to reject it because it doesn't conform to the rules, or to pass the modified or unmodified CSR to the next step.

In an embodiment, templates may be represented and stored in a variety of ways. In an embodiment, the system is able to represent the subject and validity fields in certificates, and any field that could be included in a certificate signing request, certificate revocation list, or OCSP response. In an embodiment, certificates and certificate signing requests are formatted in Abstract Syntax Notation One ("ASN.1"), which is a method for specifying abstract types and values. ASN.1 objects can be arbitrarily complex, but certificates and certificate signing requests are limited based on a set of specifications. In an embodiment, the format for X.509 v3 certificates is profiled by RFC 5280 Internet X.509 Public Key Infrastructure Certificate and Certificate Revocation List profile. In an embodiment, the format for certificate revocation lists is defined by RFC 2986: PKCS #10: Certification Request Syntax Specification Version 1.7. Certificate signing requests include a distinguished name, a public key, and an optional set of extension attributes. RFC 2985 PKCS #9: Selected Object Classes and Attribute Types Version 2.0 defines a set of common attributes, but this list is not comprehensive. RFC 5280 defines standard and required extensions for X.509 v3 certificates. Importantly, ASN.1 and RFC 2986 allow private extensions to be created, and certificate authority administrators may use custom fields in private certificates. In an embodiment, the system is able to specify rules and settings for both standard extensions and custom extension types in certificate templates.

In an embodiment, templates are represented using a JSON schema that encapsulates certificate fields and values and template rules and settings. In an embodiment, a JSON schema for representing certificate fields and values is enhanced with additional tags to represent template rules and constraints. In an embodiment, there are various challenges with this approach. In an embodiment, one is that ASN.1 identifies the fields in certificates and certificate signing requests as object identifiers ("OIDs") and not simply text field names. In an embodiment, a JSON format may also include object identifiers. In an embodiment, templates may be capable of representing any of the x.509 v3 certificate and CSR fields. In an embodiment, customers can create their own custom fields and include them in certificate signing requests and certificates. In an embodiment, the system is able to apply template rules to custom fields, without the private certificate authority 106 knowing in advance how to parse or understand the custom fields.

In an embodiment, if the certificate management server 101 tries to renew a certificate issued with a template that has changed since the certificate was issued, the private certificate authority 106 processes the request to issue the certificate using the certificate signing request and template as requested by the certificate management server 101. In an embodiment, the private certificate authority 106 is agnostic to certificate renewals. In an embodiment, the private certificate authority generates a warning which is presented in the console if a user attempts to modify a template that is in use or linked to different accounts.

In an embodiment, the certificate management server 101 simplifies the user experience for customers requesting a certificate with a template. In an embodiment, defining templates this way makes it as easy as possible for users to request a certificate that includes the correct fields and values. In an embodiment, users of the certificate management server 101 only need to specify the CN and SAN fields. A requester need not specify other information in the request that the certificate management server 101 provides to the certificate authority.

In an embodiment, templates simplify the certificate management user experience. In an embodiment, the certificate management server 101 uses templates to simplify the workflow for requesting a certificate in several ways. In an embodiment, if only one template is authorized for an account, the certificate management server 101 skips the step in which the user chooses a template. In an embodiment, once the user or system chooses a template, the certificate management server 101 displays a form to the user to enter information for the certificate request. In an embodiment, the default view of the form is verified. In an embodiment, the certificate management server 101 displays only the required fields that do not have a default value. In an embodiment, this lowers the amount of information that users are required to enter. In an embodiment, users are able to expand the form to display required fields that have default values that can be overridden. In an embodiment, the third view is a fully expanded form that shows all of the fields in the certificate request. In an embodiment, this view allows the user to see content that will be included in the request and the user can enter custom fields or fields not specified in the template. In an embodiment, users can also view but not change required fields that have default values which cannot be overridden. In an embodiment, the certificate management server 101 includes the allowed values from the template in a drop-down list for the user to select from. In an embodiment, the certificate management server 101 uses prohibited values specified in the template to validate customer input and reject out-of-range values. In an embodiment, if the template specifies non-required fields are to be rejected, the certificate management server 101 does not allow users to add additional fields.

Figure 2:
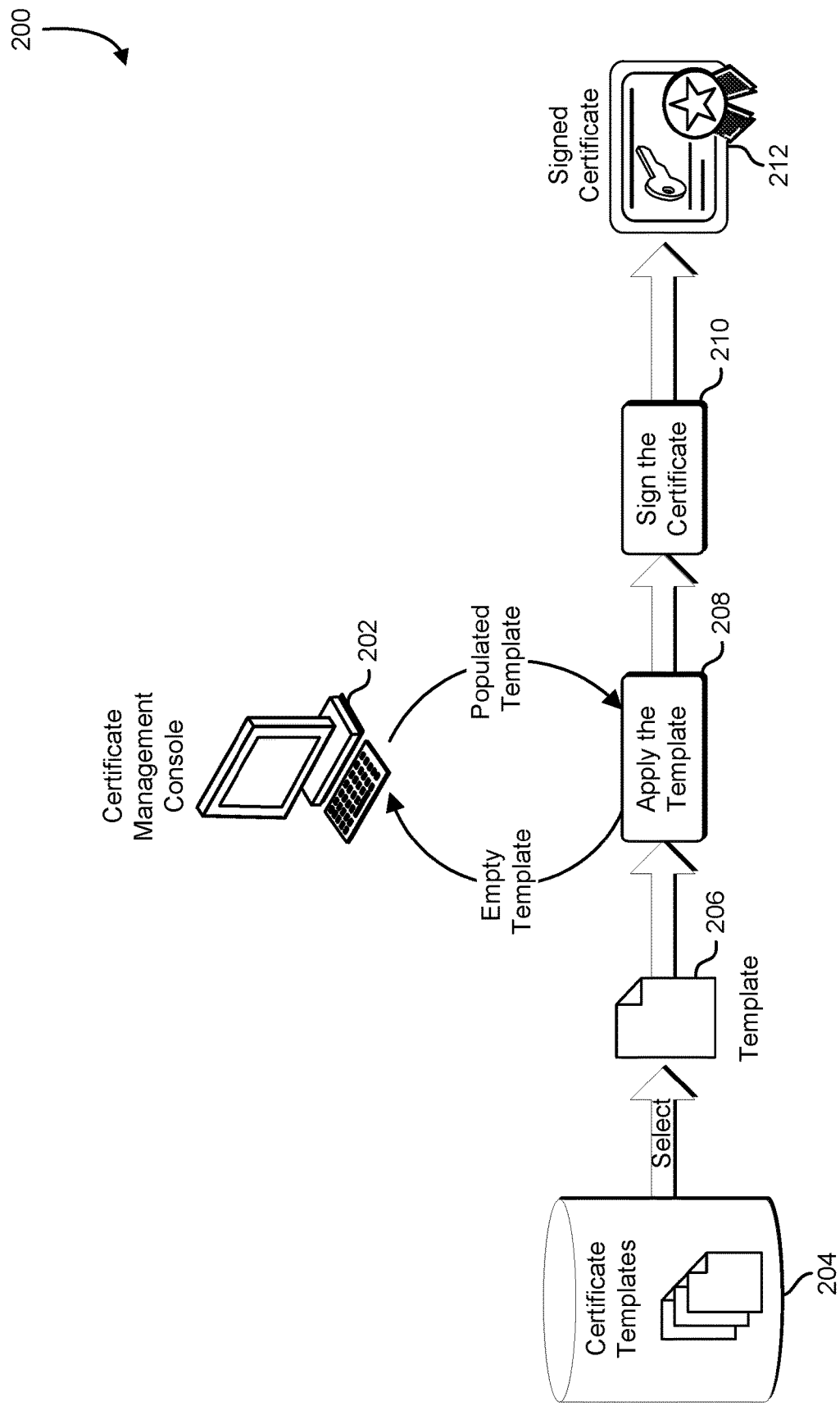
FIG. 2 illustrates an example of a process for creating a digital certificate using a template, in an embodiment.

FIG. 2 illustrates an example of a process 200 for creating a digital certificate using a template, in an embodiment. In an embodiment, a user requests a new digital certificate via a certificate management console 202. In an embodiment, the certificate management console 202 may be a client computer system, a laptop computer system, a tablet computer system, a cell phone, a mobile device, a thin client, or a computing device running a web browser. In an embodiment, the certificate management console 202 connects to a certificate management server that manages one or more private and/or public certificate authorities.

In an embodiment, the user is presented with a set of webpages that are served by the certificate management server. In an embodiment, the webpages present a sequence of dialogs that guide the user to the creation of a digital certificate. In an embodiment, the options available for creating a digital certificate are controlled by a set of certificate templates 204. In an embodiment, the certificate management server identifies a subset of the set of certificate templates 204 that the user is allowed to use. In an embodiment, the subset may be determined based in part on a request provided by the user. In an embodiment, the subset may be determined by a particular certificate authority to which the request is directed. In an embodiment, if only one template is allowed to be used, the user is not presented with an option to choose a particular template.

In an embodiment, at block 208, the template is applied to the request and the resulting certificate. In an embodiment, an applicable template 206 is selected, and the certificate management server presents dialogs on the certificate management console 202 in accordance with the contents of the applicable template 206. In an embodiment, fields that are specified as default or required in the applicable template 206 are pre-populated in the user interface presented by the certificate management console 202. In an embodiment, fields that are prohibited are disabled in the user interface presented on the certificate management console 202. In an embodiment, after the user has entered the requested information into the certificate management console 202, the request is submitted to the certificate authority. In an embodiment, the certificate authority acquires the applicable template 206 and confirms that the request complies with the terms described therein. In an embodiment, if the request does not comply with the terms described in the applicable template 206, the certificate authority may reject the request, or alternatively, correct the request using information in the applicable template 206. In an embodiment, certificate authority may correct the request, or alter the generated certificate to comply with the applicable template 206.

In an embodiment, at block 210, after the private certificate authority determines the request is properly authorized and complies with the applicable template, the private certificate authority signs the digital certificate with the private key of the certificate authority to produce the final signed certificate 212. In various embodiments, the PCA supports key types: RSA2048, RSA4096, EC p384, and EC p256.

In an embodiment, an administrator of a certificate authority can create templates using the certificate management console 202, and upload the templates to the certificate management server and one or more certificate authorities. In an embodiment, the administrator generates the template, specifying those rules and policies to be enforced, and uploads the certificate to a private certificate authority. In an embodiment, the administrator specifies a user, group of users, or security role to which the template is applicable. In an embodiment, the certificate authority imposes a preference ordering on the certificates. In an embodiment, the certificate is assigned a rank by the administrator of the certificate authority, and certificates are selected based on the rank, if more than one certificate is available to a particular requester.

In an embodiment, the system uses a "Mad Libs" structure for templates, where one section of the template specifies a set of fields that can be filled in, and another section specifies the values (and possibly rules). In an embodiment, such a format is desirable to decouple the structure from the values. In an embodiment, the other benefit of this approach is that it allows users to control the order of fields, and reorder fields if they wish. In an embodiment, a "Mad Libs" structure is used for templates, where one section of the template specifies a set of fields that can be filled in, and another section specifies the values (and possibly rules). In an embodiment, such a format is desirable to decouple the structure from the values. In an embodiment, another benefit of this approach is that it allows users to control the order of fields, and reorder fields if they wish.

Example Server Certificate Template

| Field | Rules | Example TBS Certificate Value |
| --- | --- | --- |
| Validity | Default = Validity period (13, months) Do not allow override Predate (1, day) Validity period of issued certificates must not exceed the CA certificate's validity period | Not Before: Dec. 29 00:00:00 2016 GMT Not After: Jan. 29 12:00:00 2017 GMT |
| Subject/Organization | Required, Default = Amazon, Do not allow override | Organization = Amazon |
| Subject/OU | Required, Default = AWS, Allowed values = {AWS, CDO} | Organization Unit = AWS |

-continued

| Field | Rules | Example TBS Certificate Value |
|---|---|---|
| Subject/CN | Prohibited (remove if present in CSR), Override CN using first entry in SAN extension | Common name = host.amazon.com |
| Subject/Locality | Optional, Default = Seattle Do not allow override | Locality = Seattle |
| Subject/State or province name | Optional, Default = WA Do not allow override | State or province name = WA |
| Subject/Country | Optional, Default = US Do not allow override | Country = US |
| X509v3 Authority Key Identifier | Required, Default = Inherit from CA Do not allow override | keyid:59:A4:66:06:52:A0:7B:95:92:3C:A3:94: 07:27:96:74:5B:F9:3D:D0 |
| X509v3 Subject Key Identifier | Required Default = Generate using 160 bit SHA-1 hash of the value of the subject public key Do not allow override | 76:B4:D4:99:51:CE:E8:D0:5F:63:F0:C1:A3:B9: 62:BF:53:62:C4:F0 |
| X509v3 Subject Alternative Name | Required, Allowed values = {ends with amazon.com, ends with aws.amazon.com, IP address} Maximum number of entries = 10 Allowed types = {DNS, IP address} Include the parent domain when requesting a new certificate for a www. host (eg: www.endpoint.com also SAN) | DNS:host.amazon.com, DNS:www.aws.amazon.com, IP: 10.0.1.200, DNS:aws.amazon.com |
| X509v3 Key Usage | Required, Default = critical: {Digital Signature, Key Encipherment} Do not allow override | Critical Digital Signature, Key Encipherment |
| X509v3 Extended Key Usage | Required, Default = {TLS Web Server Authentication, TLS Web Client Authentication} Do not allow override | TLS Web Server Authentication, TLS Web Client Authentication |
| X509v3 CRL Distribution Points | Required, Default = Use CA CRL URL Do not allow override | Full Name: URI:http://crl.sea1b.amazontrust.com/sca1b.crl |
| X509v3 Certificate Policies | Required Default = Use CA value Do not allow override | Policy: 2.23.140.1.2.1 |
| Authority Information Access | Required Default = Use CA values Do not allow override | OCSP - URI:http://ocsp.sca1b.amazontrust.com CA Issuers - URI:http://crt.sea1b.amazontrust.com/sca1b.crt |
| X509v3 Basic Constraints | Required Default = critical, CA:False Do not allow override | critical CA:FALSE |
| Signature Algorithm | Required Default = Inherit from CA Do not allow override | sha256WithRSAEncryption |
| General | All keys in the hierarchy use the same algorithm family, else reject the request | |
| General | The key length of the CA must be the same as or longer than the key lengths of keys of certificates issued by the CA, else reject the request | |
| General | Serial number (increment or random): random | 07:93:ee:3f:ca:74:65:61:54:7d:5f:0e:2d:71:31:32 |
| General | Two factor auth: (require): false | |
| General | Subject order matches order of template | |
| General | Extension order matches order of template | |

-continued

| Field | Rules | Example TBS Certificate Value |
|---|---|---|
| General | Remove fields from the CSR that are not required | |

Example Certificate:

```
Certificate:
    Data:
        Version: 3 (0x2)
        Serial Number:
            07:93:ee:3f:ca:74:65:61:54:7d:5f:0e:2d:71:31:32
        Signature Algorithm: sha256WithRSAEncryption
            Issuer: C=US, O=Amazon, OU=Server CA 1B, CN=Amazon
            Validity
                Not Before: Dec 29 00:00:00 2016 GMT
                Not After : Dec 29 12:00:00 2017 GMT
            Subject: CN=aws.amazon.com
            Subject Public Key Info:
                Public Key Algorithm: rsaEncryption
                    Public-Key: (2048 bit)
                    Modulus:
                        00:9d:1b:d8:39:dd:9e:a3:37:ad:9d:c1:16:12:1c
                        44:e6:11:f8:cc:00:15:99:fb:b6:e0:2f:08:la:96
                        bf:82:d8:ec:3f:d2:be:b3:4e:e0:eb:53:fd:a7:9b
                        b7:32:27:7a:dd:dd:82:b4:42:f7:2f:10:7a:df:fa
                        38:62:95:46:93:ff:cf:cf:c3:ee:ba:43:47:31:82
                        ae:ef:05:34:59:f6:75:49:11:c0:55:ba:8c:b1:17
                        bd:9b:a2:5c:3f:0e:34:71:d2:fe:b8:d9:6f:68:e1
                        e5:0f:8b:78:42:3c:46:8f:9b:da:7f:e2:fa:a1:78
                        74:b2:cf:51:7e:5d:1b:26:00:a2:e9:63:2e:ed:cf:
                        8f:7d:ed:82:4a:c7:a9:c6:72:c9:b0:4b:45:ca:24:
                        69:96:56:d3:09:7b:e7:86:a7:b3:4b:90:33:78:10:
                        94:28:40:e1:f5:94:0b:10:a1:3d:c7:b5:c8:8e:97:
                        86:f2:2e:25:93:52:85:c1:30:ff:28:85:53:b9:64:
                        af:a2:a5:4b:c5:b0:75:c5:b5:77:3b:26:e5:ad:3b:
                        c9:53:cc:5a:c0:02:04:b7:ed:52:7f:d1:ce:2a:64:
                        10:06:d5:a0:40:fb:99:b9:7d:5e:01:dc:23:c9:ca:
                        ed:a2:cc:28:e8:5f:ad:93:49:a7:12:a0:5b:fc:a7:
                        20:bb
                    Exponent: 65537 (0x10001)
            X509v3 extensions:
            X509v3 Authority Key Identifier:
keyid:59:A4:66:06:52:A0:7B:95:92:3C:A3:94:07:27:96:74:5B:F9:3D:D0
            X509v3 Subject Key Identifier:
76:B4:D4:99:51:CE:E8:D0:5F:63:F0:C1:A3:B9:62:BF:53:62:C4:F0
            X509v3 Subject Alternative Name:
                DNS:aws.amazon.com, DNS:www.aws.amazon.com
            X509v3 Key Usage: critical
                Digital Signature, Key Encipherment
            X509v3 Extended Key Usage:
                TLS Web Server Authentication, TLS Web Client
Authentication
            X509v3 CRL Distribution Points:
                Full Name:
                    URI: http://crl.sca1b.amazontrust.com/sca1b.crl
            X509v3 Certificate Policies:
                Policy: 2.23.140.1.2.1
            Authority Information Access:
                OCSP - URI:http://ocsp.sca1b.amazontrust.com
                CA Issuers -
URI:http://crt.sca1b.amazontrust.com/sca1b.crt
            X509v3 Basic Constraints: critical
                CA:FALSE
        Signature Algorithm: sha256WithRSAEncryption
            21:99:5d:b7:0b:af:c4:e4:a7:9f:a6:d2:62:7b:d6:b9:5e:a5:
            31:47:2b:d8:6a:f6:87:df:6b:d7:3f:21:40:fd:a0:88:59:ea:
            92:15:0e:17:c8:24:60:fa:90:ea:d8:48:d4:28:2d:1f:a4:b0:
            8f:c7:4e:71:14:cc:df:b4:64:92:a2:e5:72:b1:9a:f3:89:0c:
            5a:f7:2b:e6:a6:86:91:91:00:be:05:42:c4:94:2b:cd:44:b4:
            51:78:ee:13:ff:fc:ff:60:03:22:23:60:34:f4:28:0f:4b:6b:
            e8:64:08:e2:43:2e:5b:fd:fe:fe:07:2d:a8:c8:b4:0b:0c:88:
            e2:69:23:d0:72:46:3f:91:10:85:69:25:74:a1:dc:04:dc:a5:
            4d:e5:9a:01:75:09:3e:10:dd:df:4a:94:1c:f7:7f:31:8e:1d:
            91:d7:a4:6d:07:9e:ac:68:85:84:87:1b:2d:a4:6e:8f:ab:bd:
            d4:69:46:bb:79:b4:75:45:c8:0b:b2:1c:30:0c:9c:62:90:e5:
```

```
    4f:2a:e0:04:3d:b2:89:65:37:71:1b:cd:03:24:7a:ee:70:74:
    e2:bc:6c:39:33:90:7f:c5:b9:83:9e:0b:97:c1:e0:69:28:4c:
    96:79:78:81:76:c1:58:b5:81:24:c5:7b:4b:2b:2f:82:bf:11:
    31:8b:ed:e2
-----BEGIN CERTIFICATE-----
MIIEZDCCA0ygAwIBAgIQB5PuP8p0ZWFUfV8OLXExMjANBgkqhkiG9w0BAQsFADBG
MQswCQYDVQQGEWJVUZEPMA0GA1UEChMGQW1hem9uMRUwEwYDVQQLEwxTZXJ2ZXIg
Q0EgMUIxDzANBgNVBAMTBkFtYXpvbjAeFw0xNjEyMjkwMDAwMDBaFw0xNzEyMjkx
MjAwMDBaMBkxFzAVBgNVBAMTDmF3cy5hbWF6b24uY29tMIIBIjANBgkqhkiG9w0B
AQEFAAOCAQ8AMIIBCgKCAQEAnRvYOd2eozetncEWEhxE5hH4zAAVmfu24C8IGpa/
gtjsP9K+s07g61P9p5u3Mid63d2CtEL3LxB63/o4YpVGk//Pz8PuukNHMYKu7wU0
WfZ1SRHAVbqMsRe9m6JcPw40cdL+uNlvaOHlD4t4QjxGj5vaf+L6oXh0ss9Rf10b
JgCi6WMu7c+Pfe2CSsepxnLJsEtFyiRpllbTCXvnhqezS5AzeBCUKEDh9ZQLEKE9
x7XIjpeG8i4lk1KFWTD/KIVTuWSvoqVLxbB1xbV3OyblrTvJU8xawAIEt+1Sf9HO
KmQQBtWgQPuZuX1eAdwjycrtoswo6F+tk0mnEqBb/KcguwIDAQABo4IBeTCCAXUw
HwYDVR0jBBgwFoAUWaRmBlKge5WSPKOUByeWdFv5PdAwHQYDVR0OBBYEFHa01JlR
zujQX2PwwaO5Yr9TYsTwMC0GA1UdEQQmMCSCDmF3cy5hbWF6b24uY29tghJ3d3cu
YXdzLmFtYXpvbi5jb20wDgYDVR0PAQH/BAQDAgWgMB0GA1UdJQQWMBQGCCsGAQUF
BwMBBggrBgEFBQcDAjA7BgNVHR8ENDAyMDCgLqAshipodHRwOi8vY3JsLnNjYTFi
LmFtYXpvbnRydXN0LmNvbS9zY2ExYi5jcmwwEwYDVR0gBAwwCjAIBgZngQwBAgEw
dQYIKwYBBQUHAQEEaTBnMC0GCCsGAQUFBzABhiFodHRwOi8vb2NzcC5zY2ExYi5h
bWF6b25UcnVzdC5jb20wNgYIKwYBBQUHMAKGKmh0dHA6Ly9jcnQuc2NhMWIuYW1h
emudHJ1c3QuY29tL3NjYTFiLmNydDAMBgNVHRMBAf8EAjAAMA0GCSqGSIb3DQEB
CwUAA4IBAQAhmV23C6/E5KefptJie9a5XqUxRyvYavaH32vXPyFA/aCIWeqSFQ4X
yCRg+pDq2EjUKC0fpLCPx05xFMzftGSSouVysZrziQxa9yvmpoaRkQC8BULElCvN
RLRReO4T//z/YAMiI2A09CgPS2voZAjiQy5b/f7+By2oyLQLDIjiasPQckY/kRCF
aSV0odwE3KVN5ZoBdQk+EN3fSpQc938xjh2R16RtB56saIWEhxstpG6Pq73UaUa7
ebR1RcgLshwwDJxikOVPKuAEPbKJZTdxG80DJHrOcHTivGw5M5B/xbmDnguXweBp
KEyWeXiBdsFYtYEkxXtLKy+CvxExi+3i
END CERTIFICATE
```

In an embodiment, field-based rules apply to specific fields in the subject or extensions. General rules are predefined logic or rules that apply to multiple fields or to the CSR overall.

| Rule ID | Rule Type | Description |
|---|---|---|
| F1 | Field | Required (field) - the field must be included in certificates issued using this template. If the field is not present, the system will insert the default value if it is specified in the template, or reject the request if not. |
| F2 | Field | Prohibited (field, actionIfPresent) - the field may not be included in certificates issued using this template. actionIfPresent can be either Remove or Reject, indicating what to do it the field is present. If not specified, the default is to remove the field from the CSR. |
| F3 | Field | Default value (field, defaultValue) - the field and defaultValue are inserted if the CSR does not include the field. If the CSR includes the field and a value, then defaultValue overrides the value in the CSR. defaultValue can be of a complex type. For example, extension fields can specify a value and a parameter indicating whether the extension is critical or not. Systems that process certificates can ignore non-critical extensions if they don't recognize them, but they cannot ignore critical extensions. |
| F4 | Field | Allow override (field, allowOverride) - if allowOverride is specified, then a value in the CSR can override the default value. |
| F5 | Field | Allowed values (field, valueList, valueRange) - the CSR is rejected if the value for the field is not in the list of allowed values or within the range of values. |
| F6 | Field | Prohibited values (field, valueList, valueRange) - the CSR is rejected if the value for a field is in the list of prohibited values or within the range of prohibited values. |
| G1 | Validity Period | Validity period: (period, periodUnits), e.g. 1 year or 12 days. Validity period from the time the certificate is issued. If the value specified by IssueCertificate is different than rule, set the validity period to the value in the template, or reject the request. |
| G2 | Validity Period | Maximum validity period: (period, periodUnits), e.g. 1 year or 12 days. Maximum validity period from the time the certificate is issued. If the value specified by IssueCertificate exceeds the maximum, either set the validity period to the maximum or reject the request. |
| G3 | Validity Period | Predate: (period, periodUnits), (e.g. 4 days) - Not Before time of the certificate is determined by subtracting the specified period from the current time. |
| G4 | Validity Period | Set the notBefore date to the current time and date |
| G5 | Order | Subject name order matches order of {CSR, template} |
| G6 | Order | Extension order matches order of {CSR, template} |
| G7 | General | Remove any fields from the CSR that are not Required |
| G8 | General | Reject CSRs containing fields not designated as Required |

-continued

| Rule ID | Rule Type | Description |
|---|---|---|
| G9 | General | Override CN with value from the first SAN |
| G10 | General | Maximum SAN entries (integer) |
| G11 | General | Allowed SAN types {DNS, IP, . . .} |
| G12 | General | Do not issue certificates beyond the validity of the CA's certificate, else reject the request |
| G13 | General | All keys in the hierarchy use the same algorithm family, else reject the request |
| G14 | General | The key length of the CA must be the same as or longer than the key lengths of keys of certificates issued by the CA, else reject the request |
| G15 | General | Ignore CSR signature (allows changes to CSR) |
| G16 | General | Include the parent domain when requesting a new certificate for a www. host (eg: www.endpoint.com also includes endpoint.com as a SAN) |
| G17 | General | Signature algorithm (inherit or algorithm): Inherit the value from the issuing CA or specify an algorithm explicitly. |
| G18 | General | Serial number: increment or random - allow the CA administrator to control how serial numbers are generated |
| G19 | General | Two factor auth: Require certificate requests to be made with two-factor authorization enabled, and reject requests made without it. |

Figure 3:
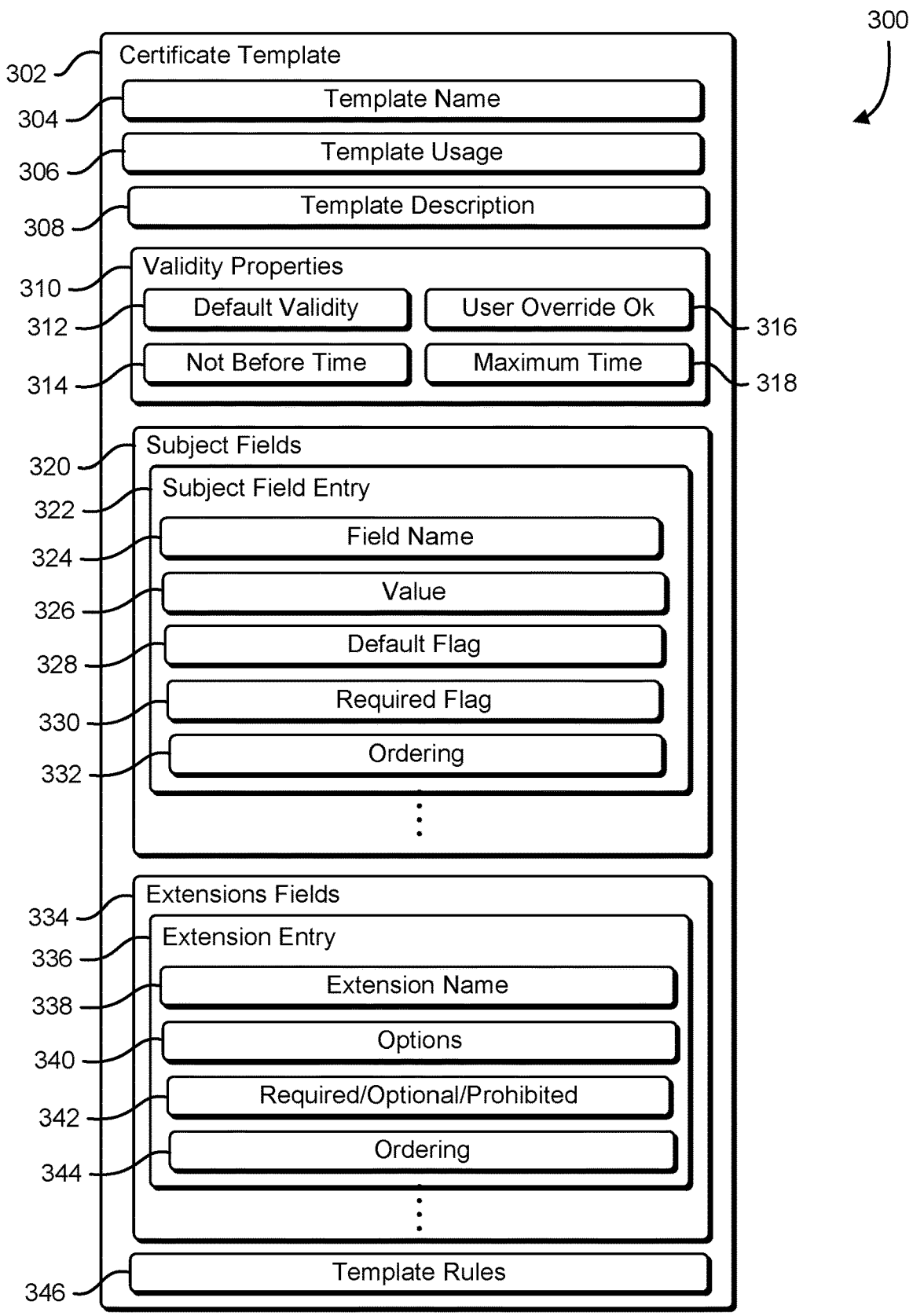
FIG. 3 illustrates an example of a template for creating a digital certificate, in an embodiment.

FIG. 3 illustrates an example of a template structure 300 for creating a digital certificate, in an embodiment. In an embodiment, a certificate template 302 is a structure or organization for data that may be used to describe restrictions and rules that can be applied to digital certificates produced by a certificate authority. In an embodiment, the certificate template 302 may be represented as an XML file, ASN.1 structure, text file, in-memory data structure, or relational database object. In an embodiment, the certificate template 302 includes a number of data elements that describe the template. In an embodiment, the certificate template includes a template name field 304 that provides a human-readable name by which the template can be referred to in the user interface. In an embodiment, the certificate template 306 includes a template usage field that describes the ways in which the certificate template may be used (such as a server certificate, a client certificate, or a service certificate). In an embodiment, the certificate template 302 includes a template description field 308 that provides additional human-readable descriptive text for the certificate. In an embodiment, when the certificate represented by the certificate template 302 is selected in the user interface, the text in the template description field 308 is shown to the user.

In an embodiment, the certificate template 302 includes a set of validity properties 310. In an embodiment, the set of validity properties 310 includes a default validity 312, a not before time 314, a user override indicator 316, and the maximum time 318. In an embodiment, the default validity 312 indicates the default validity period for a created certificate. In an embodiment, the user override indicator 316 indicates whether the user may override the default validity period. In an embodiment, the not before time 314 specifies a minimum time before which the digital certificate may not be valid. In an embodiment, the maximum time 318 specifies the maximum time at which the digital certificate may be valid. In an embodiment, the maximum time 318 may be based on the maximum validity time of the digital certificate associated with the certificate authority issuing the digital certificate.

In an embodiment, the certificate template 302 includes a set of subject field entries 322. In an embodiment, each subject field entry 322 includes a set of subject fields. In an embodiment, each subject field entry 322 includes a field name 324, a value 326, a default flag 328, a required or optional flag 330, and an ordering 332. In an embodiment, the field name 324 specifies the field represented in the template. In an embodiment, the value 326 holds a default value or required value. In an embodiment, the default flag 328 indicates whether the value is a default value. In an embodiment, the required flag indicates whether the value 326 is required. In an embodiment, the ordering 332 is a numerical order or link that identifies an ordering for the subject fields 320.

In an embodiment, the certificate template 302 includes a set of extension fields 334. In an embodiment, each extension entry 336 in the set of extension fields 334 includes an extension name 338, a set of extension options 340, and indicator flag 342, and an ordering 344. In an embodiment, the extension name 338 identifies the certificate extension to which the extension entry 336 applies. In an embodiment, the set of extension options 340 records any parameters or options for the identified extension. In an embodiment, the indicator flag 342 holds an enumeration that indicates whether the extension entry 336 is required, optional, or prohibited. In an embodiment, the ordering 332 contains a numerical order or link that identifies an ordering for the extension fields 334.

In an embodiment, the certificate template 302 includes a set of template rules 346. In an embodiment, the set of template rules 346 may include one or more rules that:
  Reject the CSR if the validity period is greater than TBD days/months/years
  Set the notBefore date to the current time and date
  Do not reorder the extension fields from the CSR
  Remove any fields from the CSR that are not Required
  Reject CSRs containing fields not designated as Required
  Order of fields matches the order in the template, unless "do not reorder" is specified
  Rule: Do not issue certificates beyond the validity of the CA's certificate
  Rule: All keys in the hierarchy use the same algorithm family
  Rule: The key length of the CA is the same as or longer than the key lengths of keys of certificates issued by the CA
  Ignore CSR signature (allows changes to CSR)
  Include the parent domain when requesting a new certificate for a www.host (e.g., www.endpoint.com also includes endpoint.com as a SAN)

Figure 4:
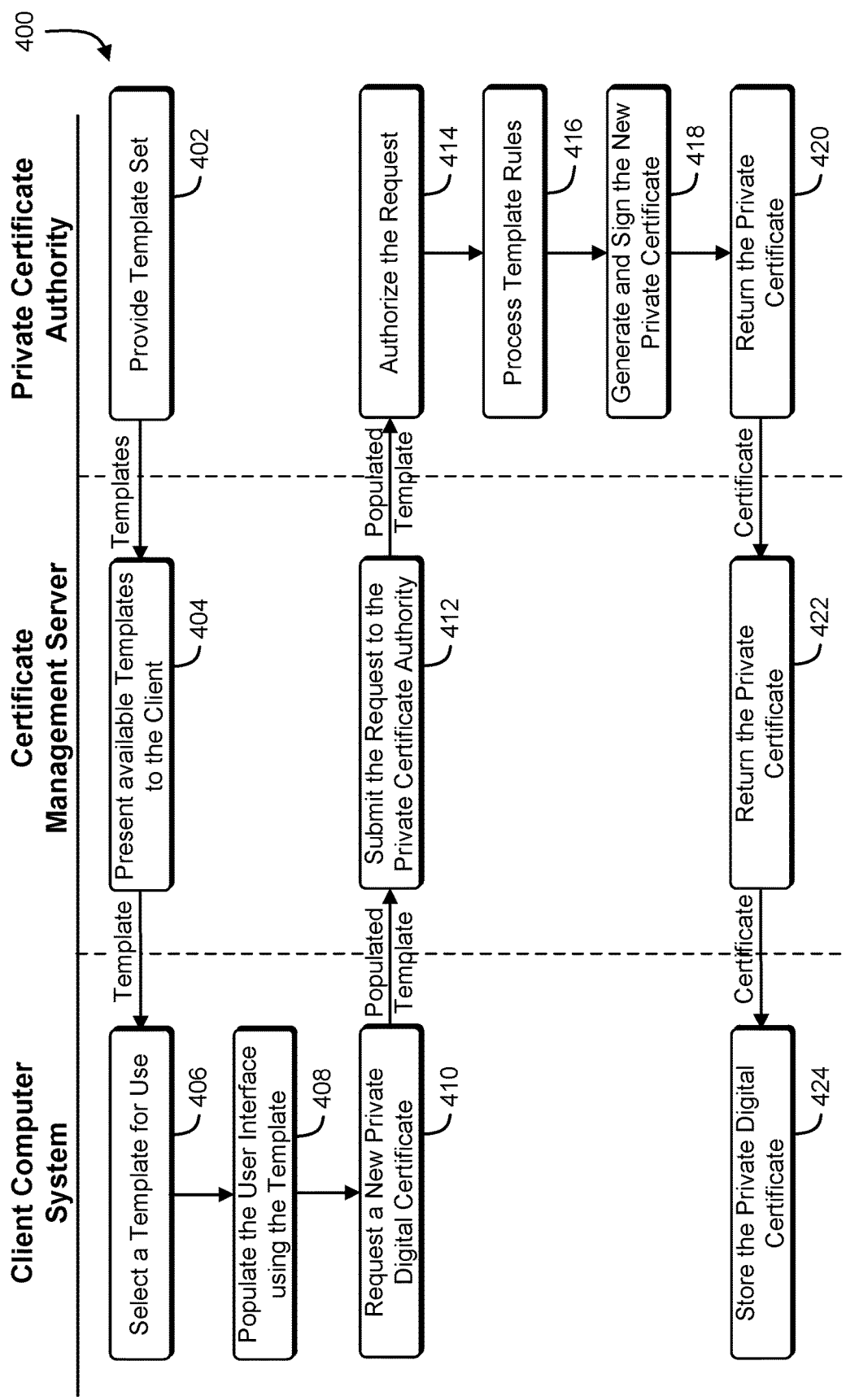
FIG. 4 illustrates an example of a process that, as a result of being performed by a client computer system, a certificate management server, and a private certificate authority, creates a new private digital certificate using a template, in an embodiment.

FIG. 4 illustrates an example of a process 400 that, as a result of being performed by a client computer system, a certificate management server, and a private certificate authority, creates a new private digital certificate using a template, in an embodiment. In an embodiment, the process begins at block 402 with a private certificate authority providing a template set to a certificate management server. In an embodiment the template set may be provided in the form of identifiers, names, and descriptions of the templates that are applicable and usable by the user of the certificate management server.

In an embodiment, at block 404, the certificate management server receives the template set from the private certificate authority, and displays the templates to the user. In an embodiment, the templates are displayed by providing a webpage with a selectable list of templates to the client computer system. In an embodiment, at block 406, the client computer system receives the list of templates from the certificate management server and displays a selectable list. In an embodiment, if only a single template is available to be used by the user, the list is not shown and the system makes the template selection on behalf of the user.

In an embodiment, at block 406, the client computer system receives the set of available templates from the certificate management server and displays the templates to the user. In an embodiment, the user selects a particular template by clicking on an element of the user interface, a drop-down box, or an interactive user interface element. In an embodiment, at block 408, the client computer system presents a user interface for creating a new private digital certificate, and populates the user interface using information gleaned from the selected template. In an embodiment, the client computer system operates the user interface in a way as to enforce various rules in the selected template. In an embodiment, the client computer system pre-populates elements of the user interface in accordance with default values in the template. In an embodiment, the client computer system disables various user interface elements having required values, or prohibited values, in accordance with the template. In an embodiment, at block 410, the user enters the request data into the user interface, and submits the request for the new digital certificate to the certificate management server.

In an embodiment, at block 412, the certificate management server receives the request, and submits the request to the private certificate authority. In an embodiment, the certificate management server confirms that the request conforms to the limitations imposed by the selected template. In an embodiment, the client computer system indicates to the certificate management server the particular template selected.

In an embodiment, at block 414, the private certificate authority receives the request for a digital certificate, and authorizes the request. In an embodiment, the request is authorized by confirming a digital signature of the request. In an embodiment, at block 416, the private certificate authority evaluates the request against the template to determine whether the request is proper. In an embodiment, the private certificate authority confirms that the template is allowed to be used by the requester. In an embodiment, the private certificate authority confirms that any required or prohibited fields (or subjects) are in accordance with the template. In an embodiment, the private certificate authority applies any special rules indicated in the template to the certificate. In an embodiment, the private certificate authority confirms that the extensions on the digital certificate are in accordance with the template. In an embodiment, if the digital certificate is not in accordance with the template, the private certificate authority may alter the request and/or the digital certificate so that the digital certificate is in compliance with the template. In an embodiment, if the private certificate authority cannot reconcile the template in the request, the request may be rejected and an error returned to the certificate management server. In an embodiment, at block 418, if the request complies with the template, a signature is generated for the digital certificate and the resulting signed private certificate is returned 420 to the certificate management server.

In an embodiment, at block 422, the certificate management server receives the signed private certificate and relays the certificate to the client computer system. In an embodiment, at block 424, the client computer system receives the signed private certificate from the certificate management server, and stores the private digital certificate. In an embodiment, an administrator may transfer the private digital certificate to another computer system, device, or service for which the certificate was requested.

Figure 5:
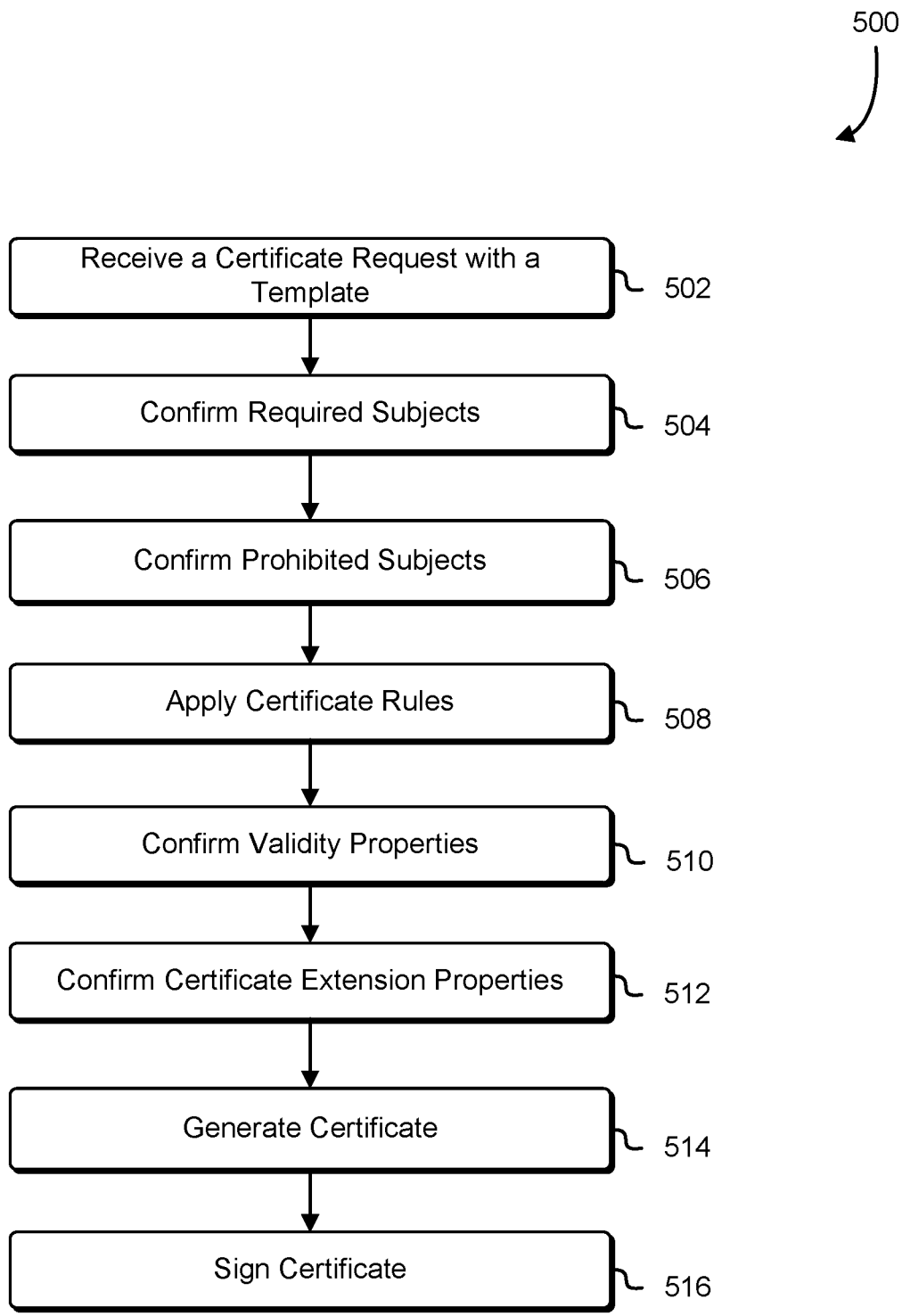
FIG. 5 illustrates an example of a process that, as a result of being performed by a private certificate authority, processes a template to produce a private digital certificate, in an embodiment.

FIG. 5 illustrates an example of a process 500 that, as a result of being performed by a private certificate authority, processes a template to produce a private digital certificate, in an embodiment. In an embodiment, the process begins at block 502 with a private certificate authority receiving a certificate request along with information that identifies a template. In an embodiment, the information is a populated template. In an embodiment, the information is an identifier associated with a template. In an embodiment, the information is a copy of the template signed by the private certificate authority. In an embodiment, the private certificate authority confirms that the template is valid and is allowed to be used by the requester.

In an embodiment, at block 504, the private certificate authority examines the template and the request and confirms that any subjects required in the template are present in the request. In an embodiment, if a required subject is missing in the request, the private certificate authority adds the required subjects to the request.

In an embodiment, at block 506, the private certificate authority examines the template in the request and confirms that any prohibited subjects are not present in the request. In an embodiment, if a prohibited subject is present in the request, the private certificate authority removes the prohibited subject from the request.

In an embodiment, at block 508, the private certificate authority applies any rules specified in the template. In an embodiment, the rules may be any of the rules specified in the present document such as rules that specify a particular signature type, or rules that specify that the issued certificate has a property or characteristic that is dependent on the certificate of the private certificate authority. In an embodiment, the template enforces a rule that the issued certificate has an expiration date no later than that of the certificate of the private certificate authority.

In an embodiment, at block 510, the private certificate authority confirms any validity properties imposed by the template. In an embodiment, the validity properties may include dates before which the certificate may not be valid, dates after which the certificate may not be valid, and maximum validity durations.

In an embodiment, at block 512, the private certificate authority confirms certificate extensions property restrictions that may be described in the template. In an embodiment, a certificate extension may be required or prohibited. In an embodiment, various parameters of a certificate extension may be required.

In an embodiment, at block 514, the private certificate authority confirms that the request is in compliance with the template, and generates an unsigned certificate. In an embodiment, the unsigned certificate may include changes from the original request to impose compliance with a template. In an embodiment, at block 516, the private certificate authority signs the unsigned certificate and returns the signed certificate to the user requester.

Figure 6:
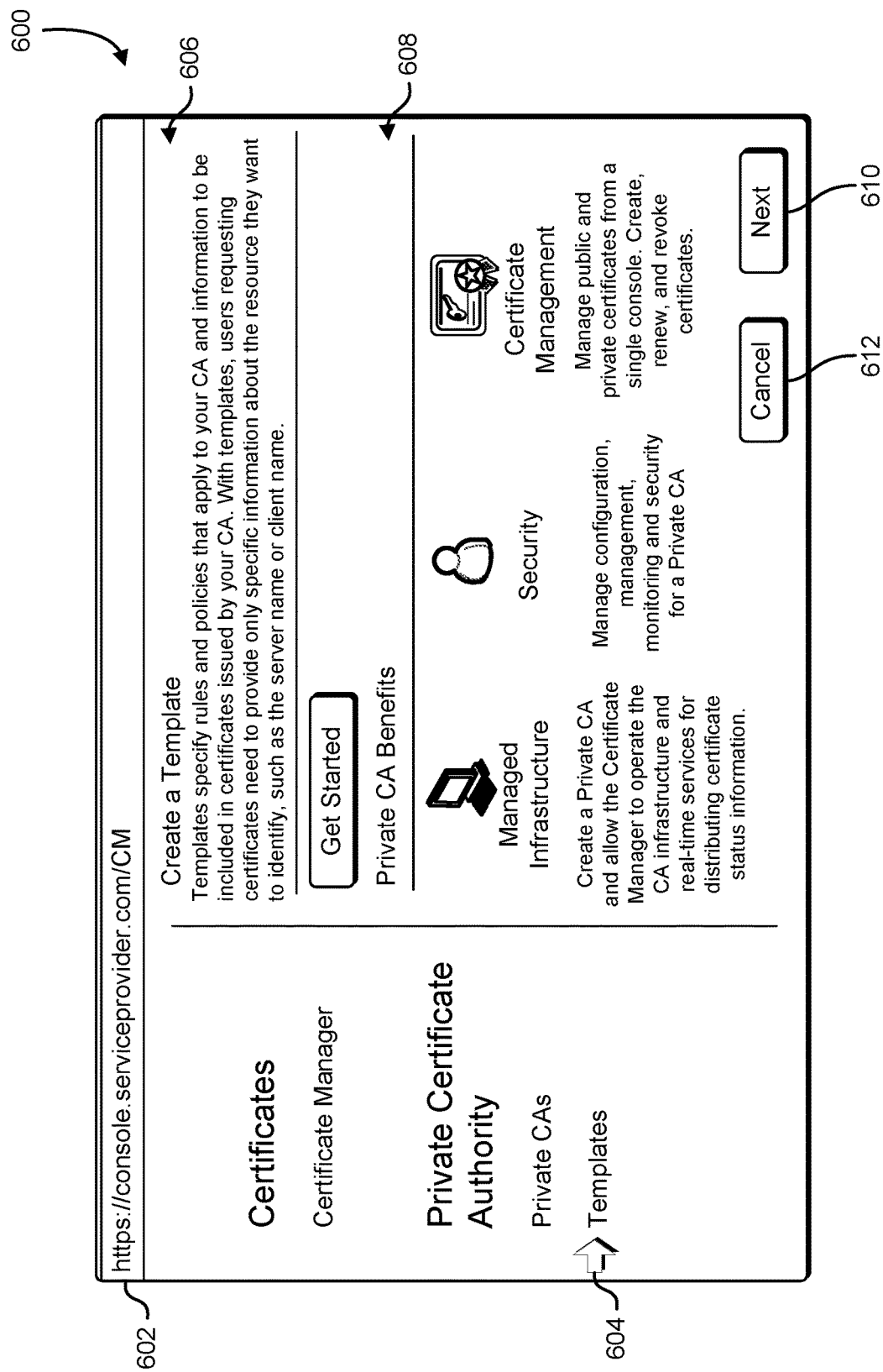
FIG. 6 illustrates an example of a user interface for creating a new certificate template, in an embodiment.

FIG. 6 illustrates an example of a user interface 600 for creating a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 6 allows the operator to begin the process of creating a certificate template. In an embodiment, a uniform resource locator 602 ("URL") for the webpage is shown at the top of the display.

In an embodiment, the user interface provides a navigation region 604 that illustrates a step progression associated with creating a template. In an embodiment, on the introductory dialog, a description section 606 describes the operation of a certificate template, and provides a "Get Started" button to initiate the template creation process. In an embodiment, a benefit section 608 describes the advantages of the private certificate authority. In an embodiment, the user interface provides a "next" button 610 to advance to a next step in the process and a cancel button 612 to abort the process.

FIG. 7 illustrates an example of a user interface 700 for setting a name of a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 7 shows the first step in the process of creating a certificate template. In an embodiment, a uniform resource locator 702 ("URL") for the webpage is shown at the top of the display.

In an embodiment, the user interface provides a navigation region 704 that illustrates a step progression associated with creating a template. In an embodiment, the step progression indicator indicates that the process of creating a template is on step one. In an embodiment, a description section prompts the user to enter the name, usage, and description for the certificate template. In an embodiment, a name entry field 706 allows the user to enter a name for the certificate template. In an embodiment, a usage drop down box 708 allows the user to indicate whether the certificate is to be used as a server, client, root CA, or subordinate CA certificate. In an embodiment, a description entry box 710 allows the user to enter descriptive text that will be displayed when selecting the template in the user interface. In an embodiment, the user interface provides a "next" button 712 to advance to a next step in the process, a "previous" button 714 to return to the previous step in the process, and a cancel button 716 to abort the process.

Figure 8:
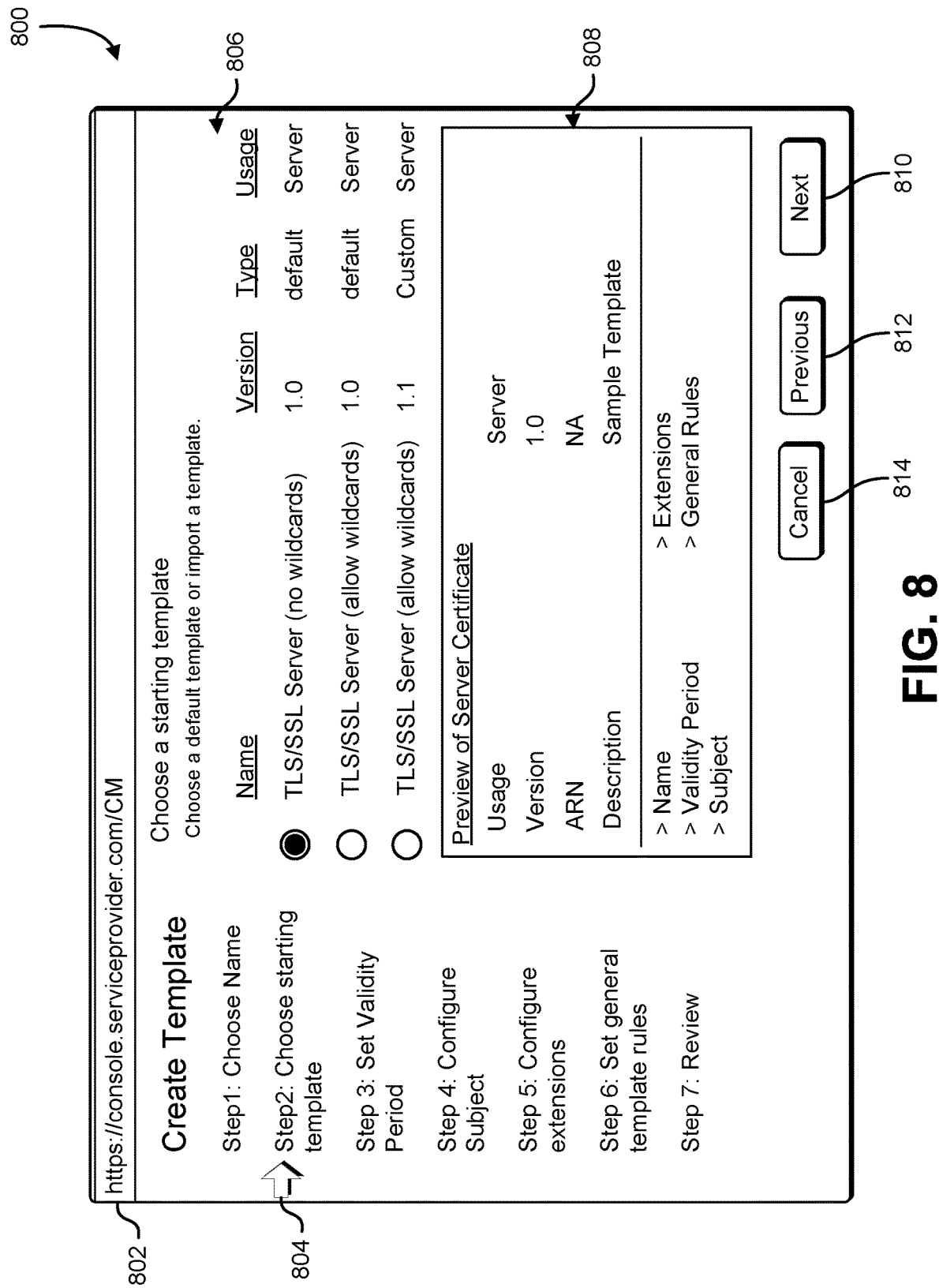
FIG. 8 illustrates an example of a user interface for choosing a starting template on which to base a new certificate template, in an embodiment.

FIG. 8 illustrates an example of a user interface 800 for choosing a starting template on which to base a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 8 shows the second step in the process of creating a certificate template. In an embodiment, a uniform resource locator 802 ("URL") for the webpage is shown at the top of the display.

In an embodiment, the user interface provides a navigation region 804 that illustrates a step progression associated with creating a template. In an embodiment, the step progression indicator indicates that the process of creating a template is on step two. In an embodiment, a description section prompts the user to select a default template from which to generate a new certificate template. In an embodiment, the options are presented as a set of buttons 806. In an embodiment, as each button is selected, details for each selection are shown in a detail area 808. In an embodiment, the user interface provides a "next" button 810 to advance to a next step in the process, a "previous" button 812 to return to the previous step in the process, and a cancel button 814 to abort the process.

Figure 9:
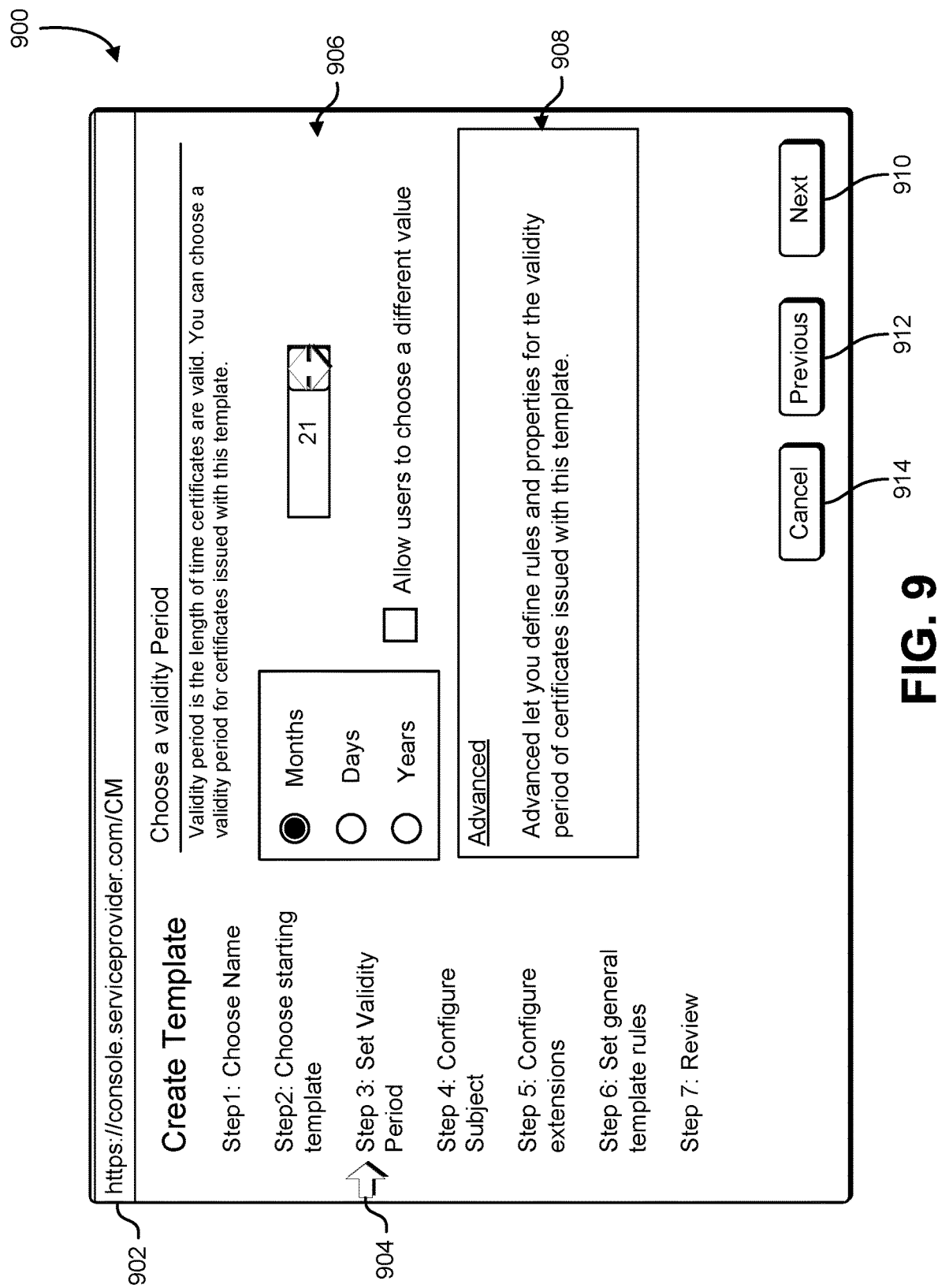
FIG. 9 illustrates an example of a user interface for setting the validity period of certificates created with a new certificate template, in an embodiment.

FIG. 9 illustrates an example of a user interface 900 for setting the validity period of certificates created with a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 9 shows the third step in the process of creating a certificate template. In an embodiment, a uniform resource locator 902 ("URL") for the webpage is shown at the top of the display.

In an embodiment, the user interface provides a navigation region 904 that illustrates a step progression associated with creating a template. In an embodiment, the step progression indicator indicates that the process of creating a template is on step three. In an embodiment, a validity period region 906 includes a set of buttons that allow the validity period to be measured in months, days, or years. In an embodiment, a numerical entry widget allows the user to enter a number that, when combined with the measuring unit, provides a validity period for the issued digital certificate. In an embodiment, a checkbox allows the user to specify that users may modify the default value specified in the template. In an embodiment, advanced features are accessible from an advanced feature area 908. In an embodiment, the advanced features area may be used to enter a maximum value for the validity period. In an embodiment, the advanced features area may be used to enter a predate or "not before" date for the digital certificate issued with a template. In an embodiment, the advanced features area may be used to select an option that restricts the validity period of issued certificates to a time range not exceeding that of the certificate associated with the private certificate authority. In an embodiment, the user interface provides a "next" button 910 to advance to a next step in the process, a "previous" button 912 to return to the previous step in the process, and a cancel button 914 to abort the process.

Figure 10:
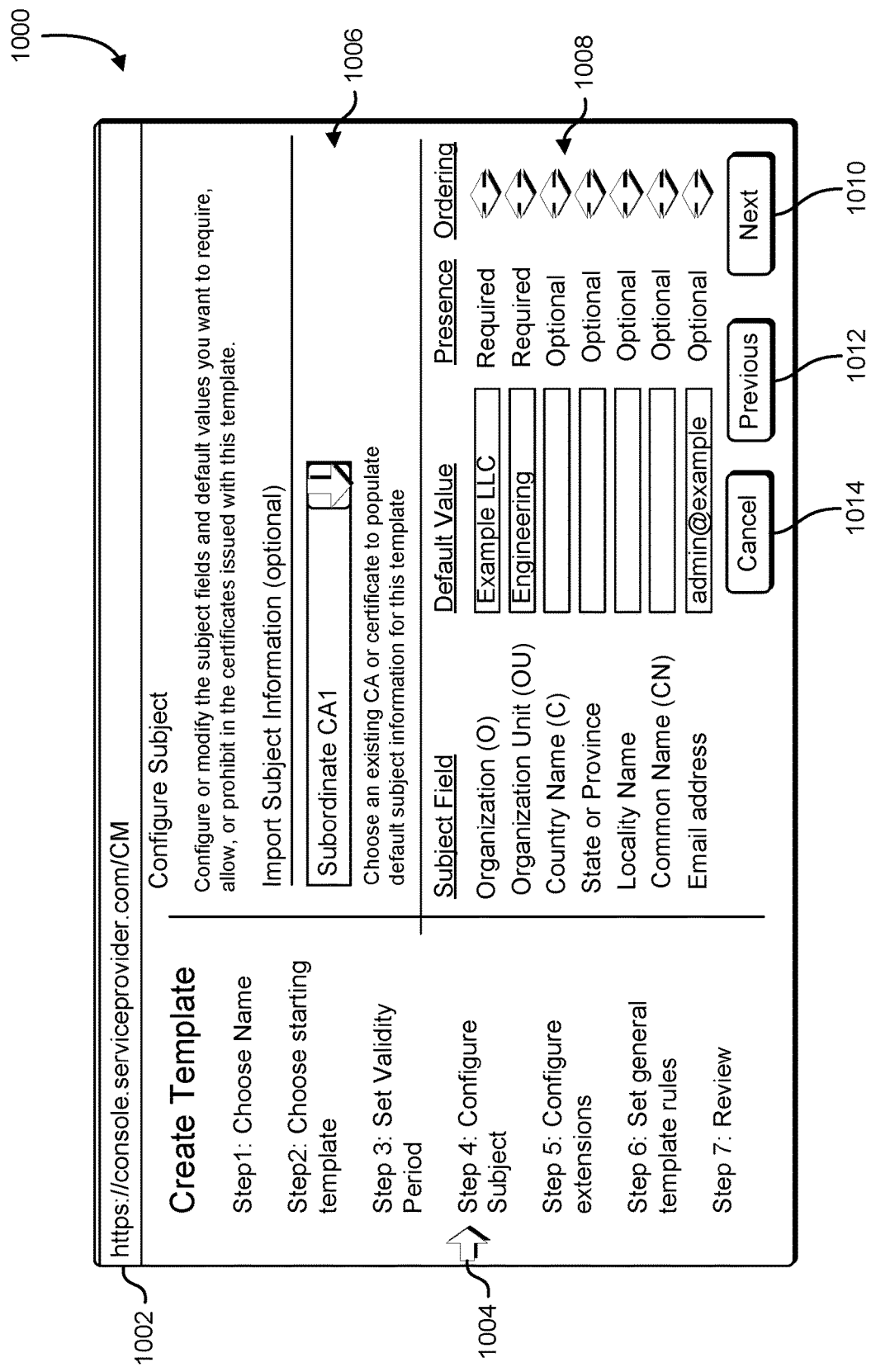
FIG. 10 illustrates an example of a user interface for configuring subject limitations of a new certificate template, in an embodiment.

FIG. 10 illustrates an example of a user interface 1000 for configuring subject limitations of a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 10 shows the fourth step in the process of creating a certificate template. In an embodiment, a uniform resource locator 1002 ("URL") for the webpage is shown at the top of the display.

In an embodiment, the user interface provides a navigation region 1004 that illustrates a step progression associated with creating a template. In an embodiment, the step progression indicator indicates that the process of creating a template is on step four. In an embodiment, a drop-down selection box 1006 allows the user to select a subordinate certificate authority or certificate to populate default subject information for the new template. In an embodiment, the user interface provides a data entry region 1008 for entering information related to the subject fields of the template. In an embodiment, a set of text entry boxes in the data entry region 1008 allows the user to enter various subject fields for the template. In an embodiment, the presence of each field may be set to be either required or optional for the template. In an embodiment, the order of each field with respect to the other fields may be adjusted using the arrows under the ordering column. In an embodiment, advanced features may be available that allow the user to force the certificates issued with the template to retain the subject order of the template or alternatively, match the order supplied in the certificate signing request. In an embodiment, an advanced feature may be provided that allows the user to set restrictions on domain names such as domain names ending in a certain suffix, or even domain names that match a certain wildcard pattern. In an embodiment, certain subject names may be disallowed if they match a certain wildcard pattern. In an embodiment, the user interface provides a "next" button 1010 to advance to a next step in the process, a "previous" button 1012 to return to the previous step in the process, and a cancel button 1014 to abort the process.

Figure 11:
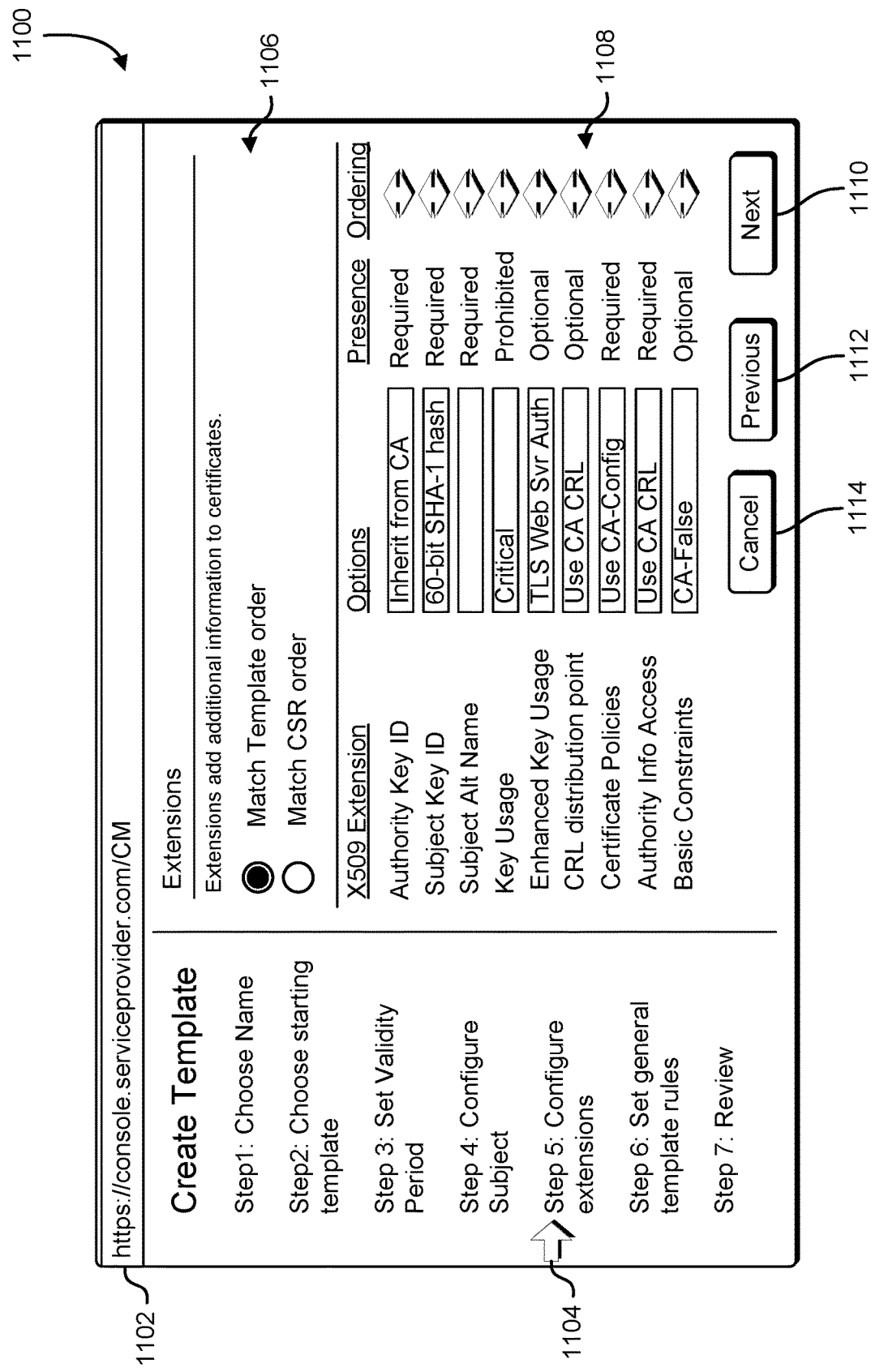
FIG. 11 illustrates an example of a user interface for configuring extension requirements of a new certificate template, in an embodiment.

FIG. 11 illustrates an example of a user interface 1100 for configuring extension requirements of a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 11 shows the fifth step in the process of creating a certificate template. In an embodiment, a uniform resource locator 1102 ("URL") for the webpage is shown at the top of the display.

In an embodiment, the user interface provides a navigation region 1104 that illustrates a step progression associated with creating a template. In an embodiment, the step progression indicator indicates that the process of creating a template is on step five. In an embodiment, a set of buttons 1106 allows the user to select an ordering for certificate extensions. In an embodiment, the set of buttons 1106 allows the template to force digital certificates to either match the extension order of the template or match the extension order of the certificate signing request. In an embodiment, the user interface provides a data entry region 1108 for entering information related to the certificate extensions. In an embodiment, a list of extension names in the data entry region 1108 allows the user to enter related options for each extension. In an embodiment, the user may enter a set of optional parameters for each extension. In an embodiment, the user may configure that an extension is required, prohibited, or optional. In an embodiment, the user may set a particular order for the extensions using a set of arrows in the data entry region 1108. In an embodiment, the user interface provides a "next" button 1110 to advance to a next step in the process, a "previous" button 1112 to return to the previous step in the process, and a cancel button 1114 to abort the process.

Figure 12:
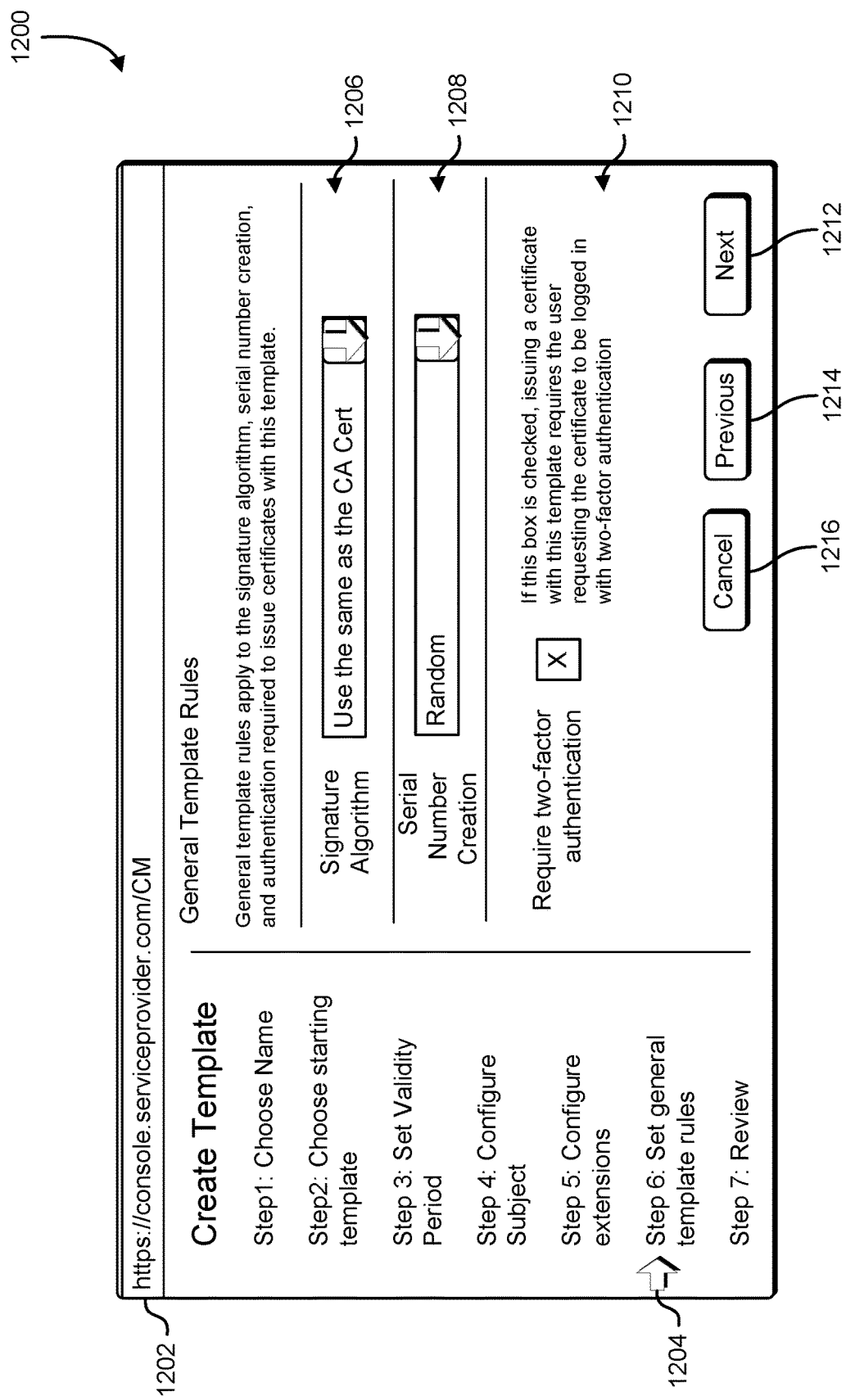
FIG. 12 illustrates an example of a user interface for setting general rules for a new certificate template, in an embodiment.

FIG. 12 illustrates an example of a user interface 1200 for setting general rules for a new certificate template, in an embodiment. In an embodiment, a certificate management server provides a user interface to a client computer system by serving a set of webpages that, when downloaded and rendered by a web browser on the client computer system, present a user interface to an operator of the client computer system. In an embodiment, the user interface shown in FIG. 12 shows the sixth step in the process of creating a certificate template. In an embodiment, a uniform resource locator 1202 ("URL") for the webpage is shown at the top of the display.

In an embodiment, the user interface provides a navigation region 1204 that illustrates a step progression associated with creating a template. In an embodiment, the step progression indicator indicates that the process of creating a template is on step six. In an embodiment, a first drop-down selection box 1206 allows the user to select a signature algorithm to be used when signing digital certificates issued using the template. In an embodiment, a second drop-down selection box 1208 allows the user to select how the serial number of the digital certificate will be created. In an embodiment, the serial number of the digital certificate may be created randomly or sequentially. In an embodiment, a checkbox 1210 allows the user to require that entities requesting a digital certificate with this template provide two-factor authentication. In an embodiment two-factor authentication may include two or more of a username and password, a text message from a cell phone, a biometric fingerprint, a retinal scan, voiceprint, a face scan, or a cryptographic signature. In an embodiment, the user interface provides a "next" button 1212 to advance to a next step in the process, a "previous" button 1214 to return to the previous step in the process, and a cancel button 1216 to abort the process.

Definitions and Abbreviations

Certificate revocation list ("CRL"): a list of certificates that have been revoked. The list is used by clients (relying parties) to determine if a certificate can be trusted. If the certificate in question is on the revocation list, it should not be trusted.

Certificate policy ("CP"): A document maintained by a CA that describes the CA's policies for issuing and otherwise managing certificates.

Certification practices statement ("CPS"): A document maintained by a CA that describes the CA's practices for issuing and managing certificates.

Offline CA: a highly secure root that is never connected to a network. Offline CAs are typically stored in a secure physical enclosure, such as a safe, and used occasionally to issue or revoke certificates used by online CAs.

Online CA: a CA that is connected to the network and used for everyday certificate issuance and revocation.

Online certificate status protocol ("OCSP"): a protocol for checking the revocation status of a certificate. The protocol was designed to provide real-time revocation status and requires less network bandwidth compared with certificate revocation lists.

public key infrastructure ("PKI"): a set of processes and policies for creating and managing digital certificates.

Private certificate: a certificate issued by and trusted only within an organization. In contrast to public certificates, which are trusted by browsers, operating systems, and applications by default, private certificates are only trusted if the root public key is explicitly installed in the trust stores of browsers, operating systems, and applications.

Public certificate: Public certificates are issued by public CAs and are trusted by default by most operating systems and browsers. Operating systems and browsers include trust stores that are configured to trust the root certificates of public certificate authorities by default. Public certificate authorities must operate according to specific practices and security standards, maintain good standing with the CA/Browser Forum and application software vendors, and provide visibility into their operations.

Root certificate: the base (root) certificate of a CA hierarchy, consisting of a self-signed certificate that binds the CA name to the public key, and signed by the private key. The root certificate of a CA is typically trusted by default by inclusion in trust stores.

Root key: the base (root) key pair of a CA hierarchy, consisting of a private and public key.

Self-signed certificate: authenticity is asserted only by the creator of the certificate. Self-signed certificates are not trusted by browsers, operating systems, and applications. Browsers that connect to a website with a self-signed certificate generate a warning indicating that the certificate is not trusted.

Certificate Signing Request ("CSR"): a block of encoded text given to a CA when applying for a certificate.

Certificate Revocation List ("CRL"): a list of certificate serial numbers that have been revoked.

Online Certificate Status Protocol ("OCSP"): an Internet protocol used for obtaining the revocation status of a certificate.

TBSCertificate: ToBeSignedCertificate is a structure composed of public key and identifying information.

Registration Authority as a Service ("RAaS"): acts as a gatekeeper to restrict types of certificates a CA is allowed to sign.

Step Functions (SFN): in an embodiment, step functions are implemented as step functions. Step functions is a web service that enables the user to coordinate the components of a distributed application using a visual workflow.

Figure 13:
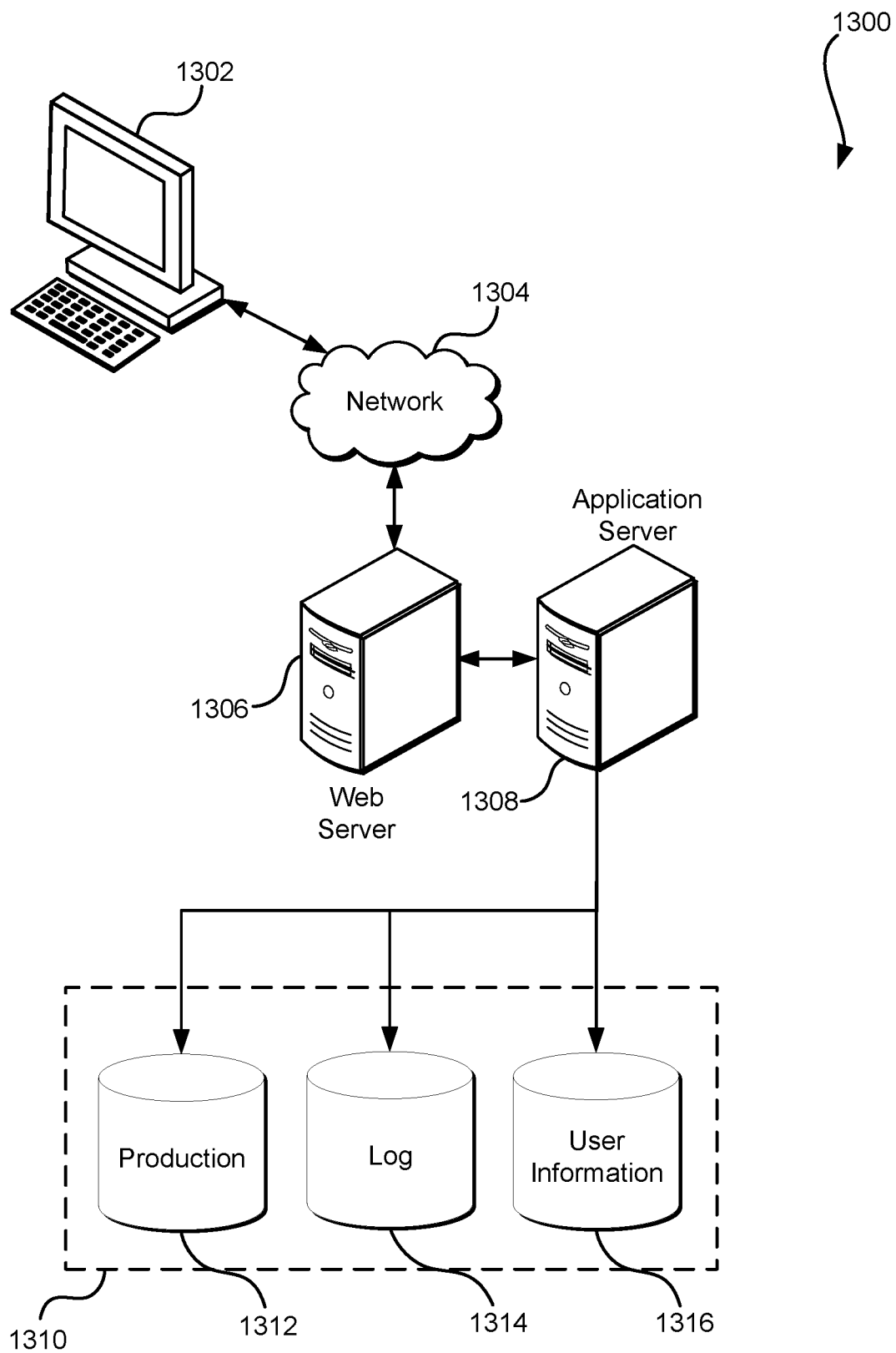
FIG. 13 illustrates a system in which various embodiments can be implemented.

FIG. 13 illustrates aspects of an example system 1300 for implementing aspects in accordance with an embodiment. As will be appreciated, although a web-based system is used for purposes of explanation, different systems may be used, as appropriate, to implement various embodiments. In an embodiment, the system includes an electronic client device 1302, which includes any appropriate device operable to send and/or receive requests, messages, or information over an appropriate network 1304 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1306 for receiving requests and serving content in response thereto, although for other networks an alternative device serving a similar purpose could be used as would be apparent to one of ordinary skill in the art.

In an embodiment, the illustrative system includes at least one application server 1308 and a data store 1310 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1302 and the application server 1308, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1310, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1312 and user information 1316, which are used to serve content for the production side. The data store also is shown to include a mechanism for storing log data 1314, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1310.

The data store 1310, in an embodiment, is operable, through logic associated therewith, to receive instructions from the application server 1308 and obtain, update or otherwise process data in response thereto and the application server 1308 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 1302. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1300 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1300, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x_1$, the probably of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. A value can be cryptographically derived using a one-way function. An encryption function can be (or can be a component of) a one-way function from the perspective of an entity that lacks information (e.g., cryptographic key and/or salt) used as input into the encryption function. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. The phrase cryptographically derived means using a one way function at least once using inputs that are the values or derived from the values (possibly cryptographically derived from the values). For example, an encryption operation is one-way to entities that do not have the decryption key.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital certificates may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a certificate template based at least in part on interactions with a first interface indicating a set of rules associated with the certificate template to be applied to one or more fields of a digital certificate;

generating, a set of permissions to operate the certificate template, where the set of permissions is granted to a second account;

in response to providing a second interface based at least in part on one or more certificate templates associated with a first account, obtaining, at a private certificate authority service, a request to generate a private digital certificate;

selecting the certificate template from a plurality of certificate templates based at least in part on information included in the request, where the plurality of certificate templates comprises the certificate template from the second account with the set of permissions and the one or more certificate templates associated with the first account;

generating a private digital certificate in accordance with the set of rules associated with the certificate template;

generating a digital signature for the private digital certificate using a private key of a private certificate authority; and providing the private digital certificate and the digital signature.

2. The computer-implemented method of claim 1, wherein the first interface includes a set of webpages that allows a user to determine the set of rules.

3. The computer-implemented method of claim 1, wherein the certificate template specifies that the digital signature be generated using a signature scheme that matches the signature scheme of the private certificate authority.

4. The computer-implemented method of claim 1, wherein:

the request specifies the private certificate authority; and
the plurality of certificate templates is associated with the private certificate authority.

5. A system, comprising:

one or more processors; and
memory to store computer-executable instructions that, as a result of being executed, cause the one or more processors to:
    obtain a set of interactions with a first interface indicating a set of rules to be applied to a set of fields of a digital certificate, the set of rules maintained in a template;
    generate a set of permissions to operate the template, where the set of permissions is granted to one or more accounts;
    in response to a second interface to indicate a second template associated with a first account different from the one or more accounts, obtain, at a private certificate authority service, a request to generate a private digital certificate;
    select, from a plurality of templates, the template based at least in part on an indication included in the request, wherein the plurality of templates comprise the second template and the template provided by the one or more accounts;
    generate the private digital certificate in accordance with at least one rule of the set of rules maintained in the template;
    generate a digital signature for the private digital certificate using a private key of a private certificate authority; and
    provide the private digital certificate and the digital signature to the first account.

6. The system of claim 5, wherein the computer-executable instructions, as a result of being executed, further cause the system to:

determine that a value included in the request associated with a field of the set of fields that does not comply with the template; and
reject the request.

7. The system of claim 5, wherein the computer-executable instructions, as a result of being executed, further cause the system to:

determine that information included in the request does not comply with the template;
modify the information included in the request to be in compliance with the template; and
fulfill the modified request.

8. The system of claim 7, wherein the computer-executable instructions, as a result of being executed, further cause the system to:

determine that a certificate extension required by the template is not present in the request; and
modify the request to add the certificate extension to the private digital certificate.

9. The system of claim 7, wherein the computer-executable instructions, as a result of being executed, further cause the system to:

determine that a subject required by the template is missing from the request; and
modify the request to add the subject to the digital certificate.

10. The system of claim 7, wherein the computer-executable instructions, as a result of being executed, further cause the system to:

determine that an expiration included in the request exceeds an allowable expiration value specified by the digital certificate; and
modify the digital certificate to not exceed the allowable expiration value specified by the digital certificate.

11. The system of claim 5, wherein the request to generate a private digital certificate is a certificate signing request that includes a name of a requester, a public key, and a digital signature generated with a private key corresponding to the public key.

12. The system of claim 5, wherein the template includes one or more fields that are prevented to be overridden by the request.

13. A non-transitory computer-readable storage medium having stored thereon executable instructions that, as a result of being executed by one or more processors of a computer system, cause the computer system to at least:

generate a template based at least in part on a set of interactions with a first interface, the set of interactions indicating a set of rules associated with one or more fields of a digital certificate;
generate a set of permissions to operate the template, where the set of permissions is granted to a second account;
cause a second interface to be provided based at least in part on one or more templates associated with a first account different from the second account;
obtain, at a private certificate authority service, a request to generate the digital certificate;
select, from a plurality of templates based at least in part on the request, the template, the plurality of templates configurable by the second account and comprising the one or more templates associated with the first account;
generate the digital certificate in accordance with the selected template;

generate a digital signature for the digital certificate using a private key of a private certificate authority; and provide the digital certificate and the digital signature to the first account.

14. The non-transitory computer-readable storage medium of claim 13, wherein the executable instructions further comprise instructions that, as a result of being executed by the one or more processors, cause the computer system to:

determine that the request to generate the digital certificate produces a conflict with the selected template; and reject the request as a result of the conflict.

15. The non-transitory computer-readable storage medium of claim 14, wherein the request specifies a subject value that conflicts with a restriction on the subject value indicated in the selected template.

16. The non-transitory computer-readable storage medium of claim 14, wherein the request specifies a value that is outside of a range specified in the selected template.

17. The non-transitory computer-readable storage medium of claim 13, wherein the executable instructions further comprise instructions that, as a result of being executed by the one or more processors, cause the computer system to:

determine that the digital certificate does not conform to the selected template; and modify the digital certificate to conform to the selected template.

18. The non-transitory computer-readable storage medium of claim 13, wherein the executable instructions further comprise instructions that, as a result of being executed by the one or more processors, cause the computer system to:

determine that expiration of the digital certificate exceeds expiration of the private certificate authority; and set the expiration of the digital certificate to that of the private certificate authority.

19. The non-transitory computer-readable storage medium of claim 13, wherein the one or more templates include the template.

20. The non-transitory computer-readable storage medium of claim 13, wherein the executable instructions further comprise instructions that, as a result of being executed by the one or more processors, cause the computer system to:

determine that a value required by the selected template is missing from the request; and add the value to the digital certificate.

\* \* \* \* \*